United States Patent
Tanaka et al.

(10) Patent No.: US 9,979,919 B2
(45) Date of Patent: May 22, 2018

(54) SOLID-STATE IMAGING DEVICE AND IMAGING SYSTEM

(71) Applicant: OLYMPUS CORPORATION, Hachioji-shi, Tokyo (JP)

(72) Inventors: Yoshinobu Tanaka, Tokyo (JP); Akira Ueno, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days. days.

(21) Appl. No.: 15/229,430

(22) Filed: Aug. 5, 2016

(65) Prior Publication Data
US 2016/0344966 A1 Nov. 24, 2016

Related U.S. Application Data

(63) Continuation of application No. PCT/JP2015/052485, filed on Jan. 29, 2015.

(30) Foreign Application Priority Data

Feb. 20, 2014 (JP) ................................. 2014-030605

(51) Int. Cl.
*H04N 5/228* (2006.01)
*H04N 5/378* (2011.01)
(Continued)

(52) U.S. Cl.
CPC ......... *H04N 5/378* (2013.01); *H04N 5/23235* (2013.01); *H04N 5/23245* (2013.01);
(Continued)

(58) Field of Classification Search
CPC ............... H04N 5/378; H04N 5/23235; H04N 5/23245; H04N 5/341; H04N 5/374; H04N 5/37452
USPC ............................... 348/222.1, 220.1, 14.12
See application file for complete search history.

(56) References Cited

U.S. PATENT DOCUMENTS 7,110,025 B1 * 9/2006 Loui ..................... H04N 5/232
348/220.1
2010/0119156 A1 * 5/2010 Noguchi .............. H04N 19/132
382/190

(Continued)

FOREIGN PATENT DOCUMENTS

JP 2008-199177 A 8/2008
JP 2012-39563 A 2/2012

(Continued)

OTHER PUBLICATIONS

International Search Report dated Mar. 31, 2015, issued in counterpart application No. PCT/JP2015/052485 with English translation(2 pages).

*Primary Examiner* — Sinh Tran
*Assistant Examiner* — Zhenzhen Wu
(74) *Attorney, Agent, or Firm* — Westerman, Hattori, Daniels & Adrian, LLP

(57) ABSTRACT

A solid-state imaging device includes a pixel signal-processing unit which includes a plurality of pixels arranged in a two-dimensional matrix, wherein the pixel signal-processing unit outputs an total pixel signal while outputting a reduced pixel signal; a difference calculation unit which outputs a digital value obtained by calculating a difference between a digital value indicating a magnitude of the total pixel signal and a digital value indicating a magnitude of the reduced pixel signal; and a bit number reduction unit which reduces the number of bits of either the digital value obtained by calculating the difference, or the digital value indicating the magnitude of the total pixel signal, and outputs a digital value whose number of bits is reduced, wherein the solid-state imaging device outputs the digital value corresponding to the total pixel signal and the digital value indicating the magnitude of the reduced pixel signal.

6 Claims, 14 Drawing Sheets

(51) Int. Cl.
  *H04N 5/232*  (2006.01)
  *H04N 5/374*  (2011.01)
  *H04N 5/341*  (2011.01)
  *H04N 5/3745* (2011.01)
  *H04N 5/372*  (2011.01)

(52) U.S. Cl.
  CPC ............ H04N 5/341 (2013.01); H04N 5/374 (2013.01); H04N 5/37452 (2013.01); H04N 5/372 (2013.01)

(56) References Cited

U.S. PATENT DOCUMENTS

| | | | |
|---|---|---|---|
| 2010/0119157 A1* | 5/2010 | Kameyama | H04N 19/115 382/195 |
| 2012/0038802 A1 | 2/2012 | Arii | |
| 2012/0257074 A1* | 10/2012 | Fujimoto | H04N 5/23229 348/222.1 |
| 2013/0128961 A1* | 5/2013 | Kim | H04N 19/82 375/240.03 |
| 2015/0078433 A1* | 3/2015 | Pearlstein | H04N 19/172 375/240.02 |
| 2016/0344969 A1* | 11/2016 | Furukawa | H03M 1/56 |

FOREIGN PATENT DOCUMENTS

| | | |
|---|---|---|
| JP | 2013-172238 A | 9/2012 |
| JP | 2013-172238 A | 9/2013 |
| WO | 2012/164896 A1 | 6/2012 |
| WO | 2012/164896 A1 | 12/2012 |

* cited by examiner

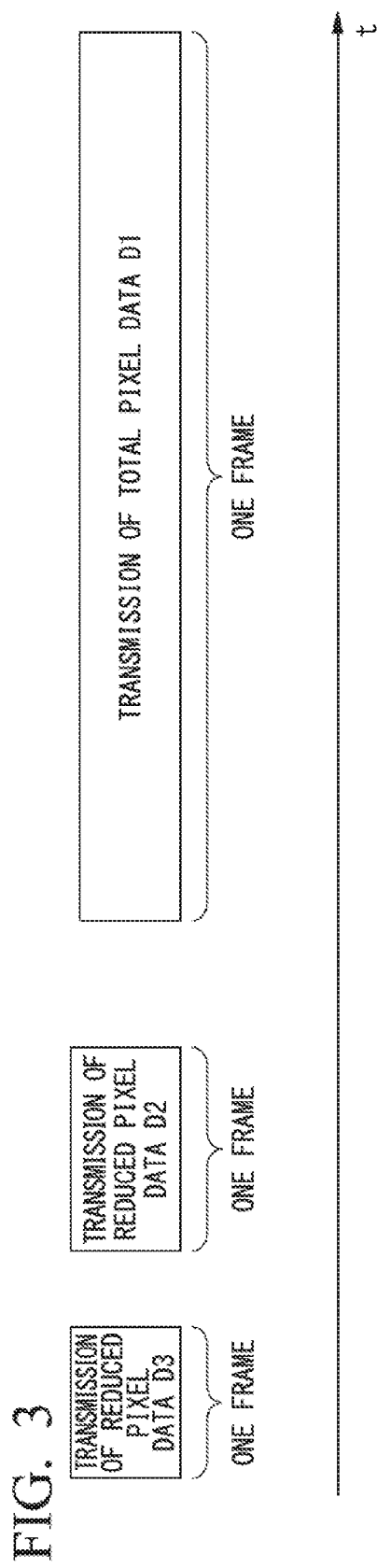

FIG. 6A

| PIXEL SIGNAL | NUMBER OF PIXELS | | | PIXEL DATA | | | | |
|---|---|---|---|---|---|---|---|---|
| | HORIZONTAL DIRECTION (Pixel) | VERTICAL DIRECTION (Pixel) | TOTAL NUMBER OF PIXELS (MPixel) | NO REDUCTION IN THE NUMBER OF BITS | | REDUCTION IN THE NUMBER OF BITS | | |
| | | | | NUMBER OF OUTPUT BITS (bit) | TOTAL NUMBER OF PIXELS × NUMBER OF OUTPUT BITS (Mbit) | DIFFERENCE CALCULATION | NUMBER OF OUTPUT BITS (bit) | TOTAL NUMBER OF PIXELS × NUMBER OF OUTPUT BITS (Mbit) |
| S1 | 5760 | 4320 | 24.9 | 14 | 348.4 | S1−S2 | 10 | 248.8 |
| S2 | 1920 | 1440 | 2.8 | 14 | 38.7 | S2−S3 | 12 | 33.2 |
| S3 | 640 | 480 | 0.3 | 14 | 4.3 | NONE (S3) | 14 | 4.3 |
| | | | | TOTAL | 391.4 | | TOTAL | 286.3 |

| PIXEL SIGNAL | NUMBER OF PIXELS | | | PIXEL DATA | | | | |
|---|---|---|---|---|---|---|---|---|
| | HORIZONTAL DIRECTION (Pixel) | VERTICAL DIRECTION (Pixel) | TOTAL NUMBER OF PIXELS (MPixel) | NO REDUCTION IN THE NUMBER OF BITS | | REDUCTION IN THE NUMBER OF BITS | | |
| | | | | NUMBER OF OUTPUT BITS (bit) | TOTAL NUMBER OF PIXELS × NUMBER OF OUTPUT BITS(Mbit) | DIFFERENCE CALCULATION | NUMBER OF OUTPUT BITS (bit) | TOTAL NUMBER OF PIXELS × NUMBER OF OUTPUT BITS(Mbit) |
| S1 | 5760 | 3240 | 18.7 | 14 | 261.3 | S1-S2 | 10 | 186.6 |
| S2 | 1920 | 1080 | 2.1 | 14 | 29.0 | S2-S3 | 12 | 24.9 |
| S3 | 640 | 360 | 0.2 | 14 | 3.2 | NONE (S3) | 14 | 3.2 |
| | | | | TOTAL | 293.5 | | TOTAL | 214.7 |

| PIXEL SIGNAL | NUMBER OF PIXELS ||| PIXEL DATA |||
| | HORIZONTAL DIRECTION (Pixel) | VERTICAL DIRECTION (Pixel) | TOTAL NUMBER OF PIXELS (MPixel) | DIFFERENCE CALCULATION | NUMBER OF OUTPUT BITS (bit) | TOTAL NUMBER OF PIXELS × NUMBER OF OUTPUT BITS(Mbit) |
|---|---|---|---|---|---|---|
| S1 | 5760 | 4320 | 24.9 | S1−S2 | 10 | 248.8 |
| S2 | 1920 | 1440 | 2.8 | S2−S3 | 12 | 33.2 |
| S3 | 640 | 480 | 0.3 | NONE (S3) | 14 | 4.3 |
| | | | | | TOTAL | 286.3 |

FIG. 7B

| PIXEL SIGNAL | NUMBER OF PIXELS ||| PIXEL DATA |||
| | HORIZONTAL DIRECTION (Pixel) | VERTICAL DIRECTION (Pixel) | TOTAL NUMBER OF PIXELS (MPixel) | DIFFERENCE CALCULATION | NUMBER OF OUTPUT BITS (bit) | TOTAL NUMBER OF PIXELS × NUMBER OF OUTPUT BITS(Mbit) |
|---|---|---|---|---|---|---|
| S1 | 5760 | 3240 | 18.7 | S1−S2 | 0 | 0.0 |
| S2 | 1920 | 1080 | 2.1 | S2−S3 | 12 | 24.9 |
| S3 | 640 | 360 | 0.2 | NONE (S3) | 14 | 3.2 |
| | | | | | TOTAL | 28.1 |

FIG. 7C

| PIXEL SIGNAL | NUMBER OF PIXELS ||| PIXEL DATA |||
| | HORIZONTAL DIRECTION (Pixel) | VERTICAL DIRECTION (Pixel) | TOTAL NUMBER OF PIXELS (MPixel) | DIFFERENCE CALCULATION | NUMBER OF OUTPUT BITS (bit) | TOTAL NUMBER OF PIXELS × NUMBER OF OUTPUT BITS(Mbit) |
|---|---|---|---|---|---|---|
| S1 | 5760 | 4320 | 24.9 | S1−S2 | 0 | 0.0 |
| S2 | 1920 | 1440 | 2.8 | S2−S3 | 10 | 27.6 |
| S3 | 640 | 480 | 0.3 | NONE (S3) | 14 | 4.3 |
| | | | | | TOTAL | 31.9 |

FIG. 7D

| PIXEL SIGNAL | NUMBER OF PIXELS ||| PIXEL DATA |||
| | HORIZONTAL DIRECTION (Pixel) | VERTICAL DIRECTION (Pixel) | TOTAL NUMBER OF PIXELS (MPixel) | DIFFERENCE CALCULATION | NUMBER OF OUTPUT BITS (bit) | TOTAL NUMBER OF PIXELS × NUMBER OF OUTPUT BITS(Mbit) |
|---|---|---|---|---|---|---|
| S1 | 5760 | 4320 | 24.9 | S1−S2 | 0 | 0.0 |
| S2 | 1920 | 1440 | 2.8 | S2−S3 | 0 | 0.0 |
| S3 | 640 | 480 | 0.3 | NONE (S3) | 14 | 4.3 |
| | | | | | TOTAL | 4.3 |

FIG. 8
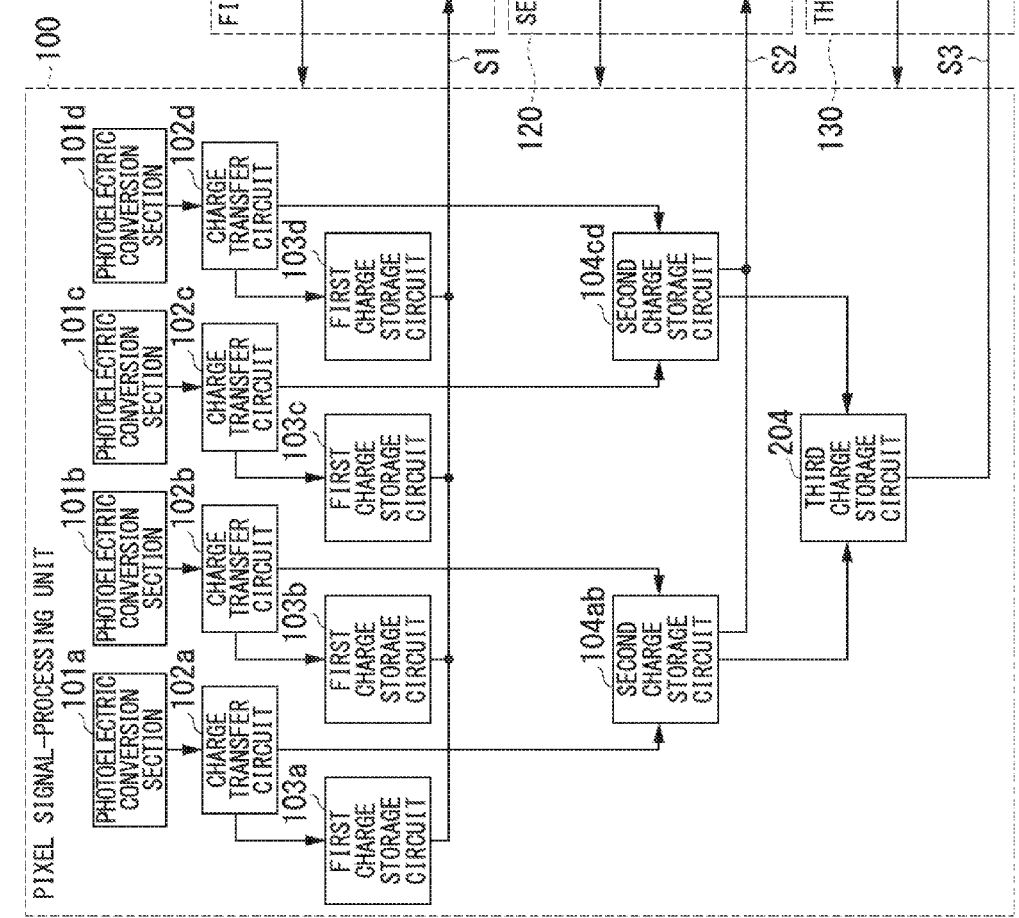
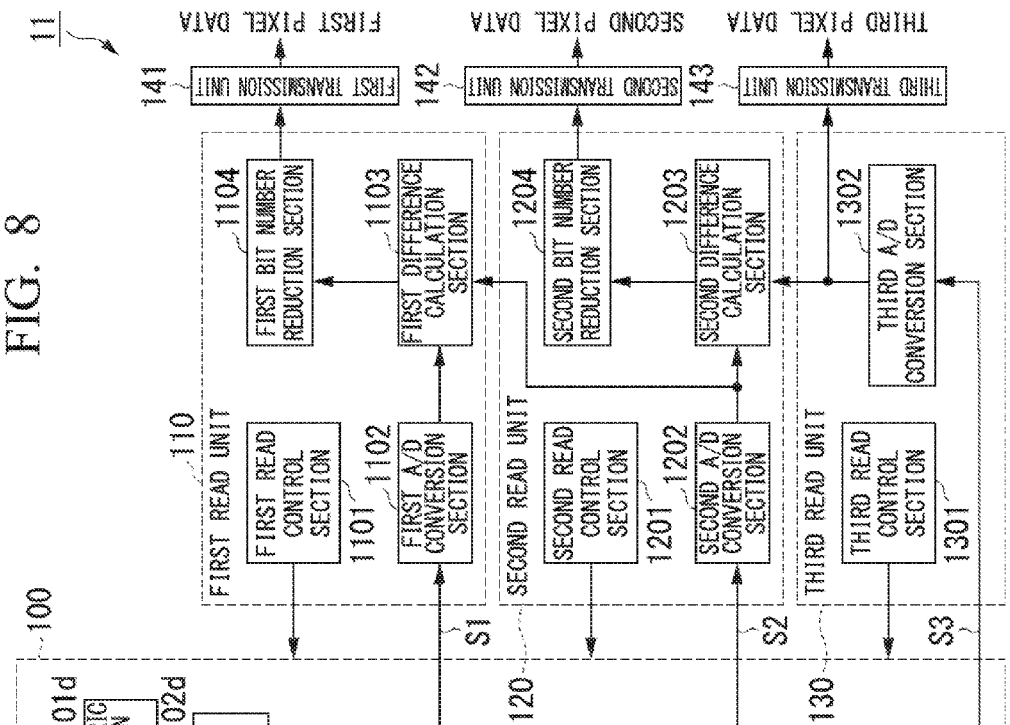

FIG. 10A

| PIXEL SIGNAL | NUMBER OF PIXELS | | | PIXEL DATA | | |
|---|---|---|---|---|---|---|
| | HORIZONTAL DIRECTION (Pixel) | VERTICAL DIRECTION (Pixel) | TOTAL NUMBER OF PIXELS (MPixel) | DIFFERENCE CALCULATION | NUMBER OF OUTPUT BITS (bit) | TOTAL NUMBER OF PIXELS × NUMBER OF OUTPUT BITS (Mbit) |
| S1 | 5760 | 4320 | 24.9 | S1-S2 | 10 | 248.8 |
| S2 | 1920 | 1440 | 2.8 | NONE (S2) | 13 | 35.9 |
| S3 | 640 | 480 | 0.3 | NONE (S3) | 14 | 4.3 |
| | | | | | TOTAL | 289.1 |

FIG. 10B

| PIXEL SIGNAL | NUMBER OF PIXELS | | | PIXEL DATA | | |
|---|---|---|---|---|---|---|
| | HORIZONTAL DIRECTION (Pixel) | VERTICAL DIRECTION (Pixel) | TOTAL NUMBER OF PIXELS (MPixel) | DIFFERENCE CALCULATION | NUMBER OF OUTPUT BITS (bit) | TOTAL NUMBER OF PIXELS × NUMBER OF OUTPUT BITS (Mbit) |
| S1 | 5760 | 3240 | 18.7 | S1-S2 | 0 | 0.0 |
| S2 | 1920 | 1080 | 2.1 | NONE (S2) | 12 | 24.9 |
| S3 | 640 | 360 | 0.2 | NONE (S3) | 14 | 3.2 |
| | | | | | TOTAL | 28.1 |

FIG. 10C

| PIXEL SIGNAL | NUMBER OF PIXELS | | | PIXEL DATA | | |
|---|---|---|---|---|---|---|
| | HORIZONTAL DIRECTION (Pixel) | VERTICAL DIRECTION (Pixel) | TOTAL NUMBER OF PIXELS (MPixel) | DIFFERENCE CALCULATION | NUMBER OF OUTPUT BITS (bit) | TOTAL NUMBER OF PIXELS × NUMBER OF OUTPUT BITS (Mbit) |
| S1 | 5760 | 4320 | 24.9 | S1-S2 | 0 | 0.0 |
| S2 | 1920 | 1440 | 2.8 | NONE (S2) | 10 | 27.6 |
| S3 | 640 | 480 | 0.3 | NONE (S3) | 14 | 4.3 |
| | | | | | TOTAL | 31.9 |

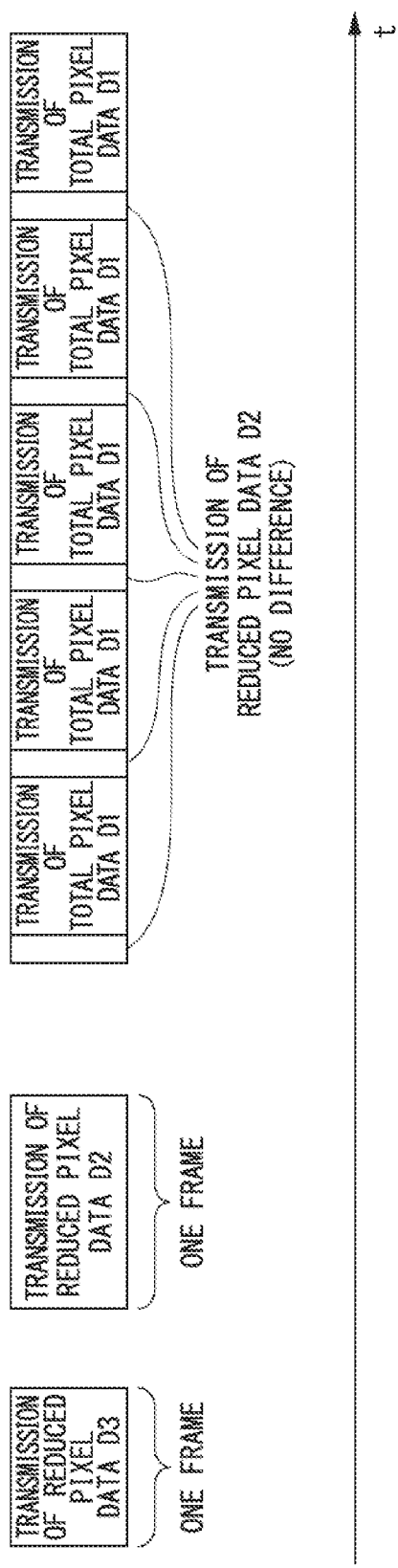

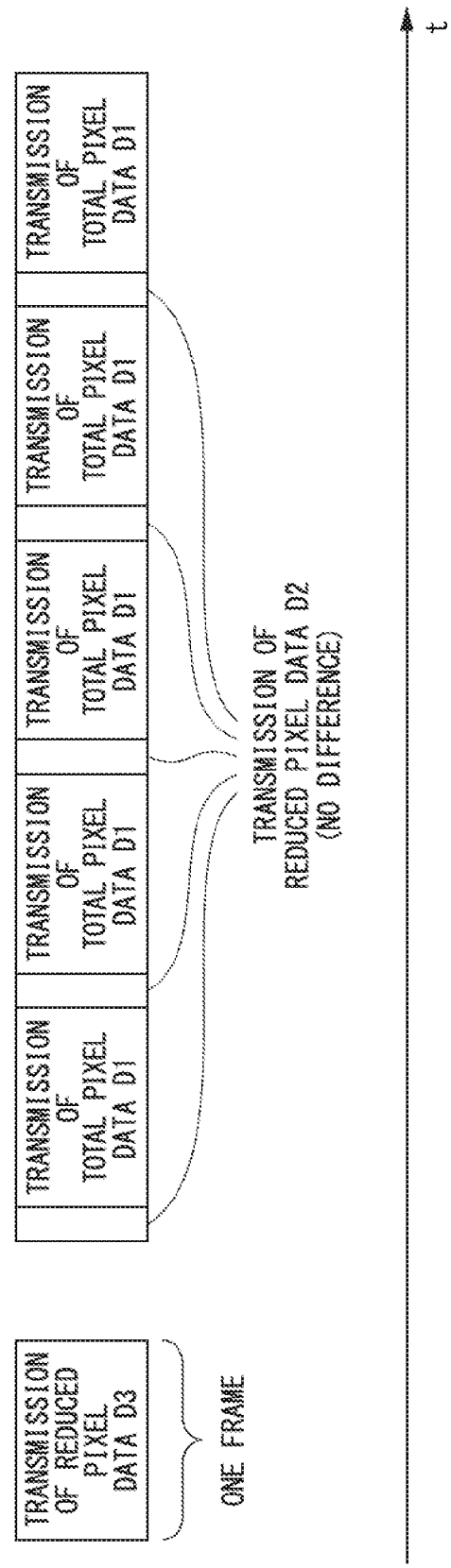

SOLID-STATE IMAGING DEVICE AND IMAGING SYSTEM

This application is a continuation application based on a PCT International Application No. PCT/JP2015/052485, filed on Jan. 29, 2015, whose priority is claimed on Japanese Patent Application No. 2014-030605, filed on Feb. 20, 2014. The contents of both the PCT International Application and the Japanese Patent Application are incorporated herein by reference.

BACKGROUND OF THE INVENTION

Field of the Invention

The present invention relates to a solid-state imaging device and an imaging system.

Description of Related Art

In recent years, imaging systems, such as video cameras or electronic still cameras, have become widespread. In these imaging systems, a charge-coupled device (CCD) type solid-state imaging device or a complementary metal oxide semiconductor (CMOS) type solid-state imaging device is mounted. In these solid-state imaging devices, a plurality of pixels are arranged in a two-dimensional matrix, and signal charges generated by a photoelectric conversion unit such as a photodiode provided in a pixel on which light is incident are amplified by an amplifier provided in the pixel and are output as a pixel signal. In this case, in a general CMOS type solid-state imaging device, pixel signals from the pixels arranged in a two-dimensional matrix are sequentially read in each row.

A CMOS type solid-state imaging device can be manufactured using a general semiconductor manufacturing process, while a CCD type solid-state imaging device can be manufactured by a dedicated manufacturing process. Accordingly, in a CMOS type solid-state imaging device, it is easy to realize multiple functions by providing various functional circuits in the solid-state imaging device, for example, as in a system-on-chip (SOC). For this reason, in a CMOS type solid-state imaging device (hereinafter, referred to as a "solid-state imaging device") mounted in an imaging system, the number of examples of using a solid-state imaging device having a configuration in which an analog-to-digital conversion circuit is provided and pixel data obtained by performing analog-to-digital conversion of a pixel signal read from each pixel is output has increased.

There are various operation modes in an imaging system. Therefore, the solid-state imaging device has a structure capable of outputting pixel data with the number of pixels suitable for the operation mode of the imaging system by performing pixel addition for summing the pixel signals read from the pixels or thinning-out reading for thinning out and reading the pixel signals of the pixels according to the operation mode of the imaging system (refer to Japanese Unexamined Patent Application, First Publication No. 2008-199177). An image-processing unit provided in an imaging system generates an image, which has a size corresponding to each operation mode of the imaging system, based on the pixel data of the various numbers of pixels that is output from the solid-state imaging device.

For example, in the case of an operation mode to capture a still image in an imaging system including a solid-state imaging device in which 5760 pixels (in the horizontal direction) by 4320 pixels (in the vertical direction) are arranged, the solid-state imaging device outputs pixel data of all pixels (5760 pixels×4320 pixels). Then, the image-processing unit generates a still image having 5760 pixels× 4320 pixels by performing image processing on the pixel data of all pixels output from the solid-state imaging device, and records the still image. In the case of an operation mode to capture a moving image in an imaging system, the solid-state imaging device outputs pixel data obtained by performing pixel addition or thinning-out to the same number of pixels (1920 pixels×1080 pixels) as the 1080P format that is mainstream in current moving image capturing, for example. Then, the image-processing unit generates a moving image having 1920 pixels×1080 pixels by performing image processing on the pixel data output from the solid-state imaging device, and records the moving image. In the case of an operation mode to output a check image (so-called live view image (through image)) for checking a subject in the imaging system, the solid-state imaging device outputs pixel data obtained by performing pixel addition or thinning-out to the same number of pixels (1920 pixels×1440 pixels) as the number of pixels that can be displayed on a display device, such as a liquid crystal display (LCD), for example. Then, the image-processing unit generates a live view image having 1920 pixels×1440 pixels by performing image processing on the pixel data output from the solid-state imaging device, and outputs the live view image.

The reason why the number of pixels of pixel data output from the solid-state imaging device is changed according to the operation mode of the imaging system as described above is that the size of an image, which is finally output from the imaging system, or a delay (real-time performance) until an update is completed changes according to the operation mode. That is, in the case of an operation mode in which the imaging system captures a still image, priority is given to the number of pixels over the real-time performance in order to ensure the quality of a still image to be generated, so that pixel data with a large number of pixels is output from the solid-state imaging device. In contrast, in the case of an operation mode in which the imaging system captures a moving image or an operation mode in which the imaging system outputs a through image, priority is given to the real-time performance over the number of pixels so that the movement of a subject included in a moving image or a through image to be generated is smooth. As a result, pixel data with the number of pixels, which has been reduced to a size that meets the standards by pixel addition or thinning-out, is output from the solid-state imaging device with a high real-time performance.

In an imaging system, there is also processing performed according to the overall state of an image to be captured, for example, control for performing imaging, such as auto exposure (AE), auto focus (AF), and auto white balance (AWB), or image recognition processing for detecting the movement or face of a subject included in the captured image. These processes can ensure accuracy even in a case where processing is performed using a small-size image. For this reason, in these processes, large-size pixel data output from the solid-state imaging device is not required, and a high real-time performance is strongly required instead. That is, in these processes, the number of pixels may be further reduced from that in the operation mode to capture a moving image or the operation mode to output a through image, but outputting pixel data from a solid-state imaging device with a higher real-time performance is required.

The control, such as AE, AF, and AWB, or the image recognition processing described above is performed in parallel with the capturing of a still image or a moving image or in parallel with the output of a through image. For this reason, in the image-processing unit provided in the imaging system, pixel data input from the solid-state imaging device for the generation of a still image or a moving image or for the output of a through image is converted to a size suitable for each process performed in the imaging system. For example, the image-processing unit converts the size of pixel data output from the solid-state imaging device to the number of pixels of 640 pixels×480 pixels in order to use the pixel data in the control, such as AE, AF, and AWB, or the image recognition processing. Accordingly, each processing unit can perform the processing it is in charge of based on the size-converted pixel data.

Thus, although the size of pixel data required for each process is different in the imaging system, the size of pixel data output from the solid-state imaging device is converted to a size suitable for each process by the image-processing unit.

SUMMARY OF THE INVENTION

According to a first aspect of the present invention, a solid-state imaging device includes a pixel signal-processing unit which includes a pixel signal-processing unit which includes a plurality of pixels arranged in a two-dimensional matrix, wherein the pixel signal-processing unit is configured to output each of pixel signals generated by each of all of the arranged pixels as an total pixel signal, while output each of the pixel signals generated by the plurality of pixels with the number of pixels reduced to a predetermined number of pixels as a reduced pixel signal; a difference calculation unit which is configured to output a digital value obtained by calculating a difference between a digital value indicating a magnitude of the total pixel signal and a digital value indicating a magnitude of the reduced pixel signal; and a bit number reduction unit which is configured to reduce the number of bits of either the digital value of the difference calculated by the difference calculation unit, or the digital value indicating the magnitude of the total pixel signal, and output a digital value whose number of bits is reduced as a digital value corresponding to the total pixel signal, wherein the solid-state imaging device is configured to output the digital value corresponding to the total pixel signal and the digital value indicating the magnitude of the reduced pixel signal.

According to a second aspect of the present invention, in the solid-state imaging device according to the first aspect, the reduced pixel signal may be obtained by averaging the pixel signals generated in the same exposure period by the plurality of corresponding pixels.

According to a third aspect of the present invention, in the solid-state imaging device according to the first aspect, the reduced pixel signal may be a pixel signal generated by a predetermined pixel, and the reduced pixel signal may be obtained among the pixel signals which are generated in the same exposure period by the plurality of corresponding pixels.

According to a fourth aspect of the present invention, in the solid-state imaging device according to the second or third aspect, the bit number reduction unit may be configured to reduce the number of bits of the digital value of the difference calculated by the difference calculation unit, and output the digital value of the difference with the reduced number of bits as a digital value corresponding to the total pixel signal. The solid-state imaging device may be configured to divide the digital value corresponding to the total pixel signal for each digital value corresponding to a predetermined number of pixels, and sequentially output a digital value obtained by division and a digital value, which indicates a magnitude of the reduced pixel signal corresponding to a predetermined number of pixels included in the digital value obtained by division, as a set.

According to a fifth aspect of the present invention, in the solid-state imaging device according to the fourth aspect, the solid-state imaging device may be configured to firstly output a digital value indicating the magnitude of the reduced pixel signal corresponding to the digital value obtained by division in each set of the digital value corresponding to the divided total pixel signal and the digital value indicating the magnitude of the reduced pixel signal corresponding to the digital value obtained by division.

According to a sixth aspect of the present invention, an imaging system includes the solid-state imaging device according to any one of the first to fifth aspects, wherein the digital value corresponding to the total pixel signal is restored to the digital value indicating the magnitude of the total pixel signal based on the digital value indicating the magnitude of the reduced pixel signal output from the solid-state imaging device.

According to a seventh aspect of the present invention, in the imaging system according to the sixth aspect, the digital value indicating the magnitude of the total pixel signal may be restored by adding the digital value indicating the magnitude of the reduced pixel signal to the digital value corresponding to the total pixel signal.

BRIEF DESCRIPTION OF THE DRAWINGS

FIG. 3 is a diagram showing the output sequence of pixel data in the solid-state imaging device according to the first embodiment of the present invention.

FIG. 6A is a table summarizing the relationship between the number of bits and the number of pixels of pixel data in the solid-state imaging device according to the first embodiment of the present invention.

FIG. 6B is a table summarizing the relationship between the number of bits and the number of pixels of pixel data in the solid-state imaging device according to the first embodiment of the present invention.

FIG. 7A is a table summarizing the relationship between the number of bits and the number of pixels of pixel data in the solid-state imaging device according to the first embodiment of the present invention.

FIG. 7B is a table summarizing the relationship between the number of bits and the number of pixels of pixel data in the solid-state imaging device according to the first embodiment of the present invention.

FIG. 7C is a table summarizing the relationship between the number of bits and the number of pixels of pixel data in the solid-state imaging device according to the first embodiment of the present invention.

FIG. 7D is a table summarizing the relationship between the number of bits and the number of pixels of pixel data in the solid-state imaging device according to the first embodiment of the present invention.

FIG. 8 is a block diagram showing the schematic configuration of a first modification example in the solid-state imaging device according to the first embodiment of the present invention.

FIG. 10A is a table summarizing the relationship between the number of bits and the number of pixels of pixel data in the solid-state imaging device of the second modification example according to the first embodiment of the present invention.

FIG. 10B is a table summarizing the relationship between the number of bits and the number of pixels of pixel data in the solid-state imaging device of the second modification example according to the first embodiment of the present invention.

FIG. 10C is a table summarizing the relationship between the number of bits and the number of pixels of pixel data in the solid-state imaging device of the second modification example according to the first embodiment of the present invention.

FIG. 11 is a diagram showing the output sequence of pixel data in a solid-state imaging device of a second embodiment of the present invention.

FIG. 13 is a diagram showing another output sequence of pixel data in the solid-state imaging device according to the second embodiment of the present invention.

DETAILED DESCRIPTION OF THE INVENTION

Figure 1:
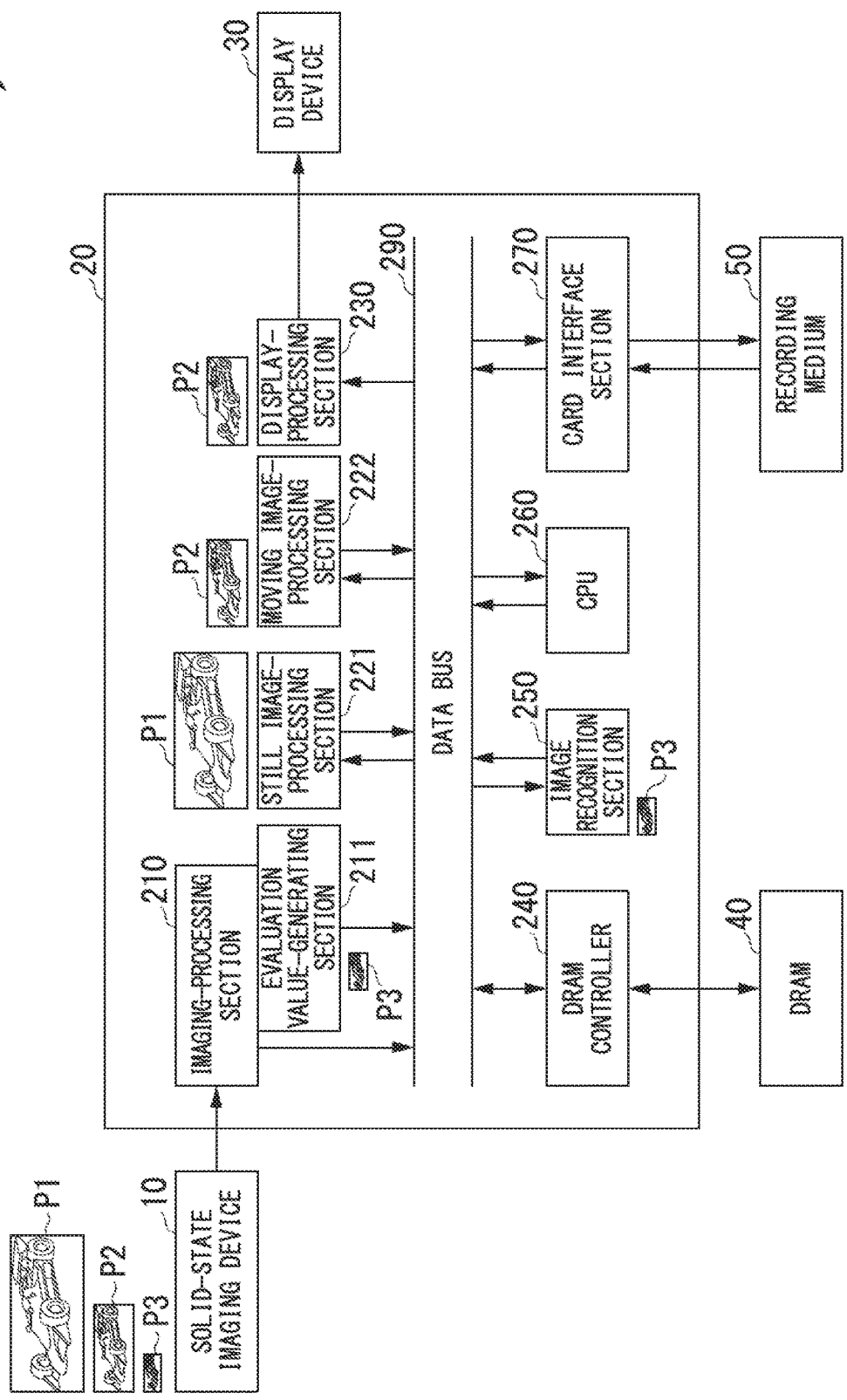
FIG. 1 is a block diagram showing the schematic configuration of an imaging system with a solid-state imaging device in the embodiment of the present invention.

Hereinafter, embodiments of the present invention will be described with reference to the diagrams. FIG. 1 is a block diagram showing the schematic configuration of an imaging system with a solid-state imaging device in the present embodiment. In FIG. 1, an imaging system 1 includes a solid-state imaging device 10, an image-processing unit 20, a display device 30, a dynamic random access memory (DRAM) 40, and a recording medium 50. The image-processing unit 20 includes an imaging-processing unit 210, an evaluation value-generating unit 211, a still image-processing unit 221, a moving image-processing unit 222, a display-processing unit 230, a DRAM controller 240, an image recognition unit 250, CPU 260, and a card interface unit 270. FIG. 1 also shows an example of an image that schematically shows the size of an image output from or processed by each component in the imaging system 1.

The solid-state imaging device 10 is a solid-state imaging device of the present embodiment that performs photoelectric conversion of an optical image of a subject formed by a lens (not shown). The solid-state imaging device 10 outputs each of a plurality of pieces of pixel data having a different number of pixels, which is based on a pixel signal corresponding to subject light, to the imaging-processing unit 210 in the image-processing unit 20. For example, as shown in FIG. 1, the solid-state imaging device 10 outputs pixel data corresponding to an image P1, pixel data corresponding to an image P2, and pixel data corresponding to an image P3, to the imaging-processing unit 210 in the image-processing unit 20. The pixel data corresponding to the image P1 has a largest number of pixels. The pixel data corresponding to the image P2 has a smaller number of pixels than that of the image P1. The pixel data corresponding to an image P3 has a smaller number of pixels than that of the image P2, that is, a smallest number of pixels. The solid-state imaging device 10 outputs each of pieces of pixel data having three sizes to the imaging-processing unit 210 in the image-processing unit 20. That is, pixel data used to generate the image P1 has a large size, pixel data used to generate the image P2 has a medium size, and pixel data used to generate the image P3 has a small size. Explanation regarding the solid-state imaging device 10 will be given later.

The image-processing unit 20 generates images by performing various kinds of image processing determined in advance based on the pixel data of each size input from the solid-state imaging device 10, and transmits (writes) data of the generated image (hereinafter, referred to as "image data") to the DRAM 40. The image-processing unit 20 reads the image data stored in the DRAM 40, and performs various kinds of image processing determined in advance.

The imaging-processing unit 210, the evaluation value-generating unit 211, the still image-processing unit 221, the moving image-processing unit 222, the display-processing unit 230, the DRAM controller 240, the image recognition unit 250, the CPU 260, and the card interface unit 270 in the imaging system 1 are connected to each other through a data bus 290. For example, reading of data from the DRAM 40 that is connected to the DRAM controller 240 by direct memory access (DMA) and writing of data to the DRAM 40 are performed.

The imaging-processing unit 210 performs pre-processing, such as shading correction or pixel defect correction, on the pixel data of each size input from the solid-state imaging device 10, and transmits (writes) image data of the pre-processing result (hereinafter, referred to as "pre-processed image data") to the DRAM 40.

The evaluation value-generating unit 211 provided in the imaging-processing unit 210 generates evaluation values for controlling auto exposure (AE), auto focus (AF), auto white balance (AWB), and the like based on the pre-processed image data of the pre-processing result, and transmits (writes) the generated evaluation values to the DRAM 40.

The processing for generating evaluation values in the evaluation value-generating unit 211 is processing in which a high real-time performance is strongly required rather than a large number of pixels. Therefore, as shown in FIG. 1, the pre-processed image data that the evaluation value-generating unit 211 uses in order to generate evaluation values is pre-processed image data obtained by performing pre-processing on the pixel data (pixel data of a small size) corresponding to the image P3 having a smallest number of pixels by the imaging-processing unit 210.

The still image-processing unit 221 acquires (reads) the pre-processed image data recorded in the DRAM 40, and generates still image data for recording by performing various kinds of image processing for recording a still image, such as demosaic processing (noise removal, YC conversion processing, and resizing processing) and JPEG compression processing. The still image-processing unit 221 acquires (reads) the still image data for recording that is recorded in the DRAM 40, and generates still image data for display by performing various kinds of image processing for reproducing a still image, such as JPEG decompression processing. The still image-processing unit 221 transmits (writes) the generated still image data for recording and the generated still image data for display to the DRAM 40.

The image processing for recording a still image in the still image-processing unit 221 is processing in which a large number of pixels is required rather than the real-time performance in order to ensure the quality of the still image. Therefore, as shown in FIG. 1, the pre-processed image data that the still image-processing unit 221 uses in order to perform image processing is pre-processed image data obtained by performing pre-processing on the pixel data (pixel data of a large size) corresponding to the image P1 having a largest number of pixels by the imaging-processing unit 210.

The moving image-processing unit 222 acquires (reads) the pre-processed image data recorded in the DRAM 40, and generates moving image data for recording by performing various kinds of image processing for recording a moving image, such as demosaic processing (noise removal, YC conversion processing, and resizing processing) and moving image compression processing (for example, MPEG compression processing or H.264 compression processing). The moving image-processing unit 222 can also generate moving image data for display for reproducing a moving image without performing moving image compression processing on the image data obtained by performing demosaic processing. The moving image-processing unit 222 acquires (reads) the moving image data for recording that is recorded in the DRAM 40, and generates moving image data for display by performing various kinds of image processing for reproducing a moving image, such as moving image compression processing (for example, MPEG compression processing or H.264 compression processing). The moving image-processing unit 222 transmits (writes) the generated moving image data for recording and the generated moving image data for display to the DRAM 40.

The image processing for recording a moving image in the moving image-processing unit 222 is processing in which a high real-time performance is required rather than a large number of pixels in order to ensure the real-time performance of the moving image. Therefore, as shown in FIG. 1, the pre-processed image data that the moving image-processing unit 222 uses in order to perform image processing is pre-processed image data obtained by performing pre-processing on the pixel data (pixel data of a medium size) corresponding to the image P2 having a smaller number of pixels than the image P1 by the imaging-processing unit 210.

The display-processing unit 230 acquires (reads) the pre-processed image data recorded in the DRAM 40, and generates a so-called live view image (through image) as a check image for checking a subject to be imaged. Then, the display-processing unit 230 performs display processing, such as processing for superimposing data for on-screen display (OSD) display on the generated live view image, and outputs the result to the display device 30 to display the result. The display-processing unit 230 can also acquire (read) the image data for display recorded in the DRAM 40, such as the still image data for display generated by the still image-processing unit 221 or the moving image data for display generated by the moving image-processing unit 222, perform display processing for superimposing the acquired image data for display on the data for OSD display, and outputs image data after the display processing to the display device 30 to display the image data.

The display processing for generating a live view image and displaying the live view image on the display device 30 in the display-processing unit 230 is processing in which a high real-time performance is required rather than a large number of pixels in order to ensure the real-time performance of the live view image to be displayed. Therefore, as shown in FIG. 1, the pre-processed image data that the display-processing unit 230 uses in order to perform processing for generating a live view image is pre-processed image data obtained by performing pre-processing on the pixel data (pixel data of a medium size) corresponding to the image P2 having a smaller number of pixels than the image P1 by the imaging-processing unit 210.

The display device 30 is a display device, such as a thin film transistor (TFT) liquid crystal display (LCD) or an electronic view finder (EVF), and displays an image corresponding to the image data after display processing that is output from the display-processing unit 230. The display device 30 may be an organic electroluminescence (EL) display, or may be an external display, such as a television.

The image recognition unit 250 acquires (reads) the pre-processed image data recorded in the DRAM 40, and detects the amount of movement or the face of a subject included in the captured image based on the acquired pre-processed image data. Then, the image recognition unit 250 generates information of the detected subject, and transmits (writes) the information to the DRAM 40. The image recognition unit 250 recognizes a scene of the captured image based on the acquired pre-processed image data. Then, the image recognition unit 250 generates information of the recognized scene, and transmits (writes) the information to the DRAM 40. The image recognition unit 250 may be configured to store the generated information of the subject or the generated information of the scene in the register in the image recognition unit 250 without transmitting the generated information of the subject or the generated information of the scene to the DRAM 40.

The processing, such as subject detection or scene recognition, in the image recognition unit 250 is processing in which a high real-time performance is strongly required rather than a larger number of pixels. Therefore, as shown in FIG. 1, the pre-processed image data that the image recognition unit 250 uses in order to perform the processing is pre-processed image data obtained by performing pre-processing on the pixel data (pixel data of a small size) corresponding to the image P3 having a smallest number of pixels by the imaging-processing unit 210.

The card interface unit 270 acquires (reads) the still image data for recording and the moving image data for recording that is recorded in the DRAM 40, and records the acquired still image data for recording or moving image data for recording in the recording medium 50. The card interface unit 270 reads the still image data for recording or the moving image data for recording that is recorded in the recording medium 50, and transmits (writes) the read image data to the DRAM 40.

The recording medium 50 is a recording medium, such as an SD memory card, and records the still image data for recording or the moving image data for recording that is output from the card interface unit 270. The still image data for recording or the moving image data for recording that is recorded is read by the card interface unit 270. Although the recording medium 50 is also a component of the imaging system 1 in FIG. 1, the recording medium 50 is configured to be detachable from the imaging system 1.

The DRAM controller 240 performs transmission (writing) of data to the connected DRAM 40 and acquisition (reading) of data from the connected DRAM 40 in response to requests for access to the DRAM 40 from a plurality of components in the imaging system 1 connected to the data bus 290, for example, in response to DMA access requests.

The DRAM 40 is a memory access-controlled by the DRAM controller 240. The DRAM 40 temporarily stores various kinds of data in the process of each component in the imaging system 1.

The CPU 260 controls the components of the imaging system 1, that is, the entire imaging system 1. For example, the CPU 260 controls the operation of each component in the imaging system 1 according to an imaging operation or a reproduction operation in the imaging system 1. For example, the CPU 260 controls a lens (not shown) when the imaging system 1 performs an imaging operation.

First Embodiment

Figure 2:
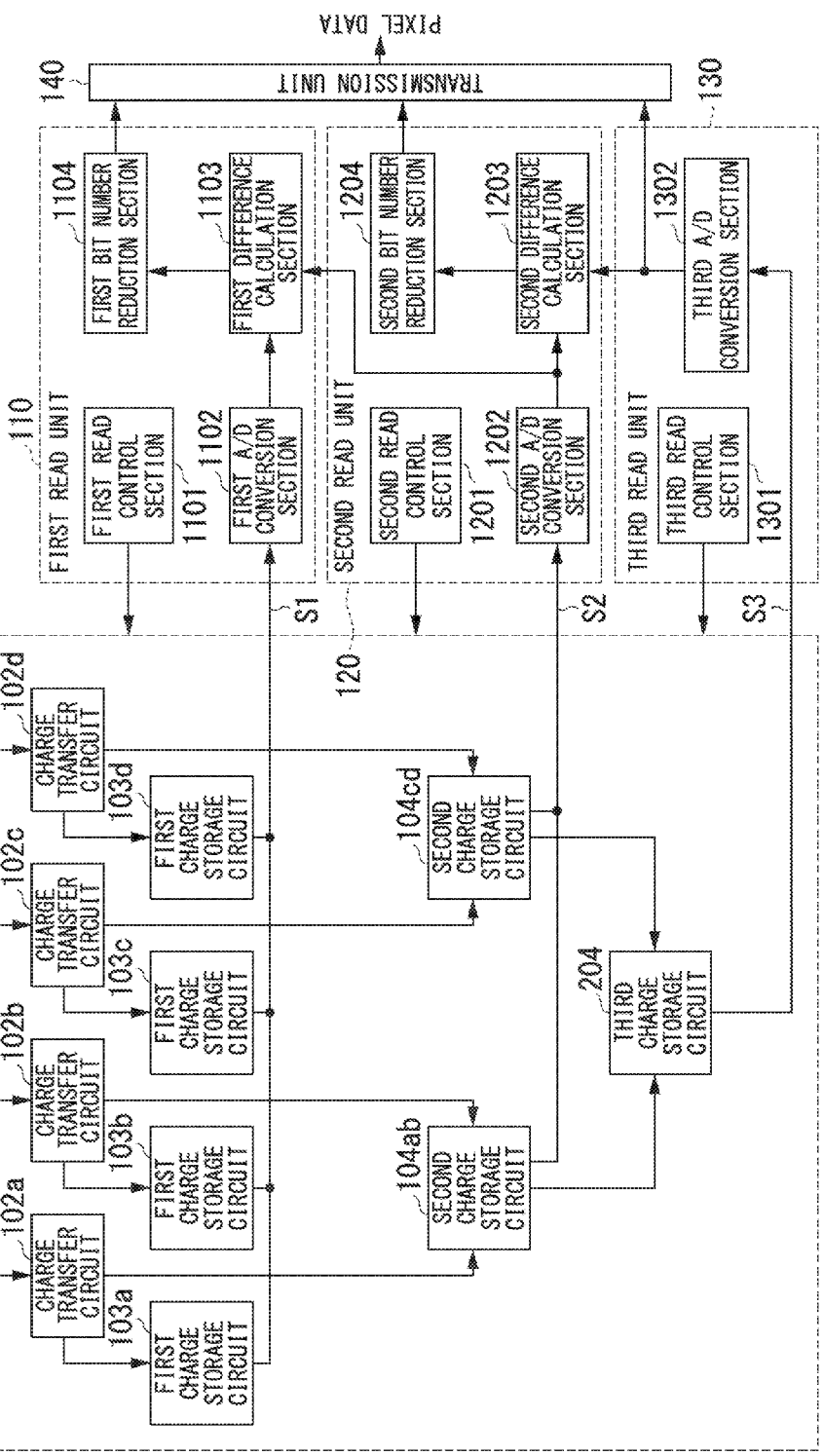
FIG. 2 is a block diagram showing the schematic configuration of a solid-state imaging device in a first embodiment of the present invention.

Next, the solid-state imaging device 10 mounted in the imaging system 1 of the present embodiment will be described. FIG. 2 is a block diagram showing the schematic configuration of the solid-state imaging device 10 in the first embodiment. The solid-state imaging device 10 shown in FIG. 2 is configured to include a pixel signal-processing unit 100, a first read unit 110, a second read unit 120, a third read unit 130, and a transmission unit 140.

The pixel signal-processing unit 100 includes a pixel array in which a plurality of pixels are formed so as to be arranged in a two-dimensional matrix. The pixel signal-processing unit 100 outputs a pixel signal, which is obtained by photoelectric conversion of incident light in each pixel, to the corresponding first read unit 110, second read unit 120, or third read unit 130 in response to a read control signal input from each of the first read unit 110, the second read unit 120, and the third read unit 130. The pixel signal-processing unit 100 can separately output an total pixel signal S1 that is each of pixel signals of all pixels arranged in the pixel array, a reduced pixel signal S2 that is each of pixel signals of pixels obtained by reducing the number of pixels arranged in the pixel array, and a reduced pixel signal S3 that is each of pixel signals of pixels obtained by further reducing the number of pixels arranged in the pixel array. That is, the pixel signal-processing unit 100 can separately output the total pixel signal S1 corresponding to the image P1 having a largest number of pixels, the reduced pixel signal S2 corresponding to the image P2 having a smaller number of pixels than the image P1, and the reduced pixel signal S3 corresponding to the image P3 having a smallest number of pixels (refer to FIG. 1).

Then, the pixel signal-processing unit 100 outputs each total pixel signal S1 to the first read unit 110 in response to the read control signal input from the first read unit 110. The pixel signal-processing unit 100 outputs each reduced pixel signal S2 to the second read unit 120 in response to the read control signal input from the second read unit 120. The pixel signal-processing unit 100 outputs each reduced pixel signal S3 to the third read unit 130 in response to the read control signal input from the third read unit 130.

The first read unit 110 reads each total pixel signal S1 from the pixel signal-processing unit 100, and outputs each digital value, which is obtained by performing analog-to-digital conversion of each total pixel signal S1, to the transmission unit 140. The first read unit 110 calculates a difference between the digital value of each total pixel signal S1 obtained by analog-to-digital conversion and the digital value of the reduced pixel signal S2 obtained by the analog-to-digital conversion of the second read unit 120. Then, the first read unit 110 reduces the number of bits of each digital value, which is obtained by calculating the difference, and outputs the result to the transmission unit 140.

The second read unit 120 reads each reduced pixel signal S2 from the pixel signal-processing unit 100, and outputs each digital value, which is obtained by performing analog-to-digital conversion of the read reduced pixel signal S2, to the transmission unit 140. The second read unit 120 calculates a difference between the digital value of each reduced pixel signal S2 obtained by analog-to-digital conversion and the digital value of the reduced pixel signal S3 obtained by the analog-to-digital conversion of the third read unit 130. Then, the second read unit 120 reduces the number of bits of each digital value, which is obtained by calculating the difference, and outputs the result to the transmission unit 140. The second read unit 120 outputs each digital value, which is obtained by performing analog-to-digital conversion of the read reduced pixel signal S2, to the first read unit 110.

The third read unit 130 reads each reduced pixel signal S3 from the pixel signal-processing unit 100, and outputs each digital value, which is obtained by performing analog-to-digital conversion of the read reduced pixel signal S3, to the transmission unit 140.

The transmission unit 140 transmits each of the digital values, which are output from the first read unit 110, the second read unit 120, and the third read unit 130 as pixel data to the external. That is, the transmission unit 140 transmits (outputs) a plurality of digital values of a different number of pixels, as pixel data, to the imaging-processing unit 210 in the image-processing unit 20.

Through the configuration described above, the solid-state imaging device 10 outputs each of the pieces of pixel data of three sizes to the imaging-processing unit 210 in the image-processing unit 20.

In the solid-state imaging device 10, the order or the like when transmitting (outputting) each piece of pixel data to the imaging-processing unit 210 in the image-processing unit 20 is not particularly defined. However, the pixel data based on the total pixel signal S1 that is output from the first read unit 110 is pixel data corresponding to the image P1 having a largest number of pixels. The pixel data based on the reduced pixel signal S2 that is output from the second read unit 120 is pixel data corresponding to the image P2 having a smaller number of pixels than the image P1. The pixel data based on the reduced pixel signal S3 that is output from the third read unit 130 is pixel data corresponding to the image P3 having a smallest number of pixels (refer to FIG. 1). For this reason, the pixel data based on the reduced pixel signal S2 can be output more quickly than the pixel data based on the total pixel signal S1. The pixel data based on the reduced pixel signal S3 can be output more quickly than the pixel data based on the reduced pixel signal S2. Therefore, outputting the pixel data based on the reduced pixel signal S3 first, outputting the pixel data based on the reduced pixel signal S2 next, and outputting the pixel data based on the total pixel signal S1 last is advantageous when performing the processing in the image-processing unit 20.

For example, the processing for generating the evaluation value in the evaluation value-generating unit 211 and the processing, such as subject detection or scene recognition, in the image recognition unit 250 is processing in which a high real-time performance is strongly required. Therefore, it is advantageous to output the pixel data based on the reduced pixel signal S3, which is to be used in this processing, first.

For example, the image processing for recording a moving image in the moving image-processing unit 222 or the display processing for generating a live view image and displaying the live view image on the display device 30 in the display-processing unit 230 is processing in which a high real-time performance is required even though the real-time performance is not so high as in the processing of the evaluation value-generating unit 211 or the image recognition unit 250. Therefore, it is advantageous to output the pixel data based on the reduced pixel signal S2, which is to be used in this processing, earlier than the pixel data based on the total pixel signal S1.

Through the configuration described above, the solid-state imaging device 10 reduces the number of bits of pixel data based on the pixel signals of all pixels (total pixel signal S1) provided in the pixel signal-processing unit 100 and the number of bits of pixel data based on the pixel signals of pixels (reduced pixel signal S2) obtained by reducing the number of pixels, and outputs the result to the imaging-processing unit 210 in the image-processing unit 20. At the same time, the solid-state imaging device 10 outputs the pixel data based on the pixel signals of pixels (reduced pixel signal S3) obtained by further reducing the number of pixels to the imaging-processing unit 210 in the image-processing unit 20. Therefore, in the image-processing unit 20 mounted in the imaging system 1 of the present embodiment, pixel data used in processing that requires a real-time performance and pixel data used in processing that requires the image quality can be properly used depending on each process.

Next, each component of the solid-state imaging device 10 according to the first embodiment will be described in more detail. First, the configuration of the pixel signal-processing unit 100 of the solid-state imaging device 10 according to the first embodiment shown in FIG. 2 will be described in more detail. In the solid-state imaging device 10, as described above, a pixel array in which a plurality of pixels are arranged in a two-dimensional matrix is provided in the pixel signal-processing unit 100. However, for simplicity of explanation, FIG. 2 shows an example of a case in which four pixels of pixels a to d are arranged in the pixel signal-processing unit 100 provided in the solid-state imaging device 10. In the solid-state imaging device 10, components, such as a vertical scanning circuit or a horizontal scanning circuit, are provided. However, such components are omitted in FIG. 2. The vertical scanning circuit or the horizontal scanning circuit drives the components of each of the pixels arranged in the pixel signal-processing unit 100 according to the control of a control device (for example, the CPU 260 in the image-processing unit 20) which controls the solid-state imaging device 10 and which is provided in the imaging system 1 in which the solid-state imaging device 10 is mounted.

In the following explanation, in order to distinguish pixels corresponding to the respective components, that is, the pixels a to d, a reference numeral of "a", "b", "c", or "d" indicating the corresponding pixel will be attached to the end of the reference numeral of each component for explanation. More specifically, for the following explanation, "a" is given to the end of the reference numeral of a component corresponding to the pixel a, "b" is given to the end of the reference numeral of a component corresponding to the pixel b, "c" is given to the end of the reference numeral of a component corresponding to the pixel c, and "d" is given to the end of the reference numeral of a component corresponding to the pixel d. Components corresponding commonly to the pixels a to d will be described without the reference numerals of "a" to "d" being attached thereto. In a case where pixels are not distinguished when describing a component even though the component is a component corresponding to one of the pixels a to d, explanation will be given with only the reference numeral of each component without showing the reference numerals of "a" to "d".

The pixel signal-processing unit 100 of the solid-state imaging device 10 according to the first embodiment shown in FIG. 2 is configured to include four photoelectric conversion units 101a to 101d, four charge transfer circuits 102a to 102d, four first charge storage circuits 103a to 103d, two second charge storage circuits 104ab and 104cd, and a third charge storage circuit 204. In the pixel signal-processing unit 100 of the solid-state imaging device 10 according to the first embodiment shown in FIG. 2, the pixel a is formed by the components of the photoelectric conversion unit 101a, the charge transfer circuit 102a, and the first charge storage circuit 103a, and the pixel b is formed by the components of the photoelectric conversion unit 101b, the charge transfer circuit 102b, and the first charge storage circuit 103b. In the pixel signal-processing unit 100 of the solid-state imaging device 10 according to the first embodiment shown in FIG. 2, the pixel c is formed by the components of the photoelectric conversion unit 101c, the charge transfer circuit 102c, and the first charge storage circuit 103c, and the pixel d is formed by the components of the photoelectric conversion unit 101d, the charge transfer circuit 102d, and the first charge storage circuit 103d. The second charge storage circuit 104ab is a component common to the pixels a and b, and the second charge storage circuit 104cd is a component common to the pixels c and d. The third charge storage circuit 204 is a component common to the second charge storage circuits 104ab and 104cd, that is, a component common to the pixels a to d.

Each of the photoelectric conversion units 101a to 101d is a photoelectric conversion unit such as a photodiode that generates signal charges by performing photoelectric conversion of incident light and stores the generated signal charges.

The charge transfer circuits 102a to 102d are circuits for transferring the signal charges, which are generated and stored in the corresponding photoelectric conversion units 101a to 101d, to the corresponding first charge storage circuits 103a to 103d and the corresponding second charge storage circuit 104ab or 104cd.

The first charge storage circuits 103a to 103d are circuits that store (accumulate) signal charges that are generated by the corresponding photoelectric conversion units 101a to 101d and are transferred from the corresponding charge transfer circuits 102a to 102d. Each of the first charge storage circuits 103a to 103d is also a circuit that outputs a signal voltage corresponding to the stored signal charges, as the pixel signal of each total pixel signal S1, to a first A/D conversion unit 1102 in the first read unit 110 in response to a read control signal that is input from a first read control unit 1101 in the corresponding first read unit 110.

The second charge storage circuits 104ab and 104cd are circuits that store (accumulate) signal charges of the amount of charges, which is obtained by averaging the amounts of signal charges that are generated by the corresponding photoelectric conversion units 101a to 101d and are transferred from the corresponding charge transfer circuits 102a to 102d, or signal charges for averaging the amounts of signal charges (averaging charge storage circuits). That is, each of the second charge storage circuits 104ab and 104cd is a circuit that stores signal charges in a state in which the number of pixels provided in the pixel signal-processing unit 100 has been reduced by averaging the signal charges of the respective pixels provided in the pixel signal-processing unit 100 of the solid-state imaging device 10. Each of the second charge storage circuits 104*ab* and 104*cd* is also a circuit for transferring the signal charges of the averaged amount of charges or the signal charge for averaging to the third charge storage circuit 204. Each of the second charge storage circuits 104*ab* and 104*cd* is also a circuit that outputs a signal voltage corresponding to the stored signal charges, as each pixel signal of the reduced pixel signal S2 in a state in which the number of pixels has been reduced, to a second A/D conversion unit 1202 in the second read unit 120 in response to a read control signal that is input from a second read control unit 1201 in the corresponding second read unit 120.

The third charge storage circuit 204 is a circuit that stores (accumulates) signal charges, which are obtained by averaging the amounts of signal charges that are input from the second charge storage circuits 104*ab* and 104*cd*, or signal charges for averaging the amounts of signal charges (averaging charge storage circuit). That is, similar to the second charge storage circuits 104*ab* and 104*cd*, the third charge storage circuit 204 is also a circuit that stores signal charges in a state in which the number of pixels provided in the pixel signal-processing unit 100 of the solid-state imaging device 10 has been reduced. However, the third charge storage circuit 204 stores signal charges in a state in which the number of pixels has been further reduced after reducing the number of pixels provided in the pixel signal-processing unit 100 of the solid-state imaging device 10 by each of the second charge storage circuits 104*ab* and 104*cd*. The third charge storage circuit 204 is also a circuit that outputs a signal voltage corresponding to the stored signal charges, as each pixel signal of the reduced pixel signal S3 in a state in which the number of pixels has been further reduced, to a third A/D conversion unit 1302 in the third read unit 130 in response to a read control signal that is input from a third read control unit 1301 in the corresponding third read unit 130.

In the pixel signal-processing unit 100 of the solid-state imaging device 10 according to the first embodiment shown in FIG. 2, the second charge storage circuit 104*ab* corresponds to the charge transfer circuits 102*a* and 102*b*, that is, the photoelectric conversion units 101*a* and 101*b*. In the pixel signal-processing unit 100 of the solid-state imaging device 10 according to the first embodiment shown in FIG. 2, the second charge storage circuit 104*cd* corresponds to the charge transfer circuits 102*c* and 102*d*, that is, the photoelectric conversion units 101*c* and 101*d*. In the pixel signal-processing unit 100 of the solid-state imaging device 10 according to the first embodiment shown in FIG. 2, the third charge storage circuit 204 corresponds to the second charge storage circuits 104*ab* and 104*cd*, that is, all of the photoelectric conversion units 101*a* to 101*d*.

Examples of the configuration of averaging the signal charges of pixels in order to reduce the number of pixels include a configuration of performing the averaging when storing the signal charges generated by the photoelectric conversion units 101*a* and 101*b* in the second charge storage circuit 104*ab* and a configuration of performing the averaging when outputting the signal voltage corresponding to each signal charge stored in the second charge storage circuit 104*ab*. For example, a configuration of performing the averaging when outputting the signal voltage corresponding to each signal charge stored in the second charge storage circuit 104*ab* may also be used.

Through the configuration described above, the pixel signal-processing unit 100 exposes the respective pixels in the same exposure period, and stores the signal charge generated by the photoelectric conversion unit 101 in the first charge storage circuit 103 in each pixel. At the same time, the pixel signal-processing unit 100 stores a signal charge obtained by averaging the respective signal charges (signal charge obtained by reducing the number of pixels) in the second charge storage circuit 104, and stores a signal charge obtained by further averaging the respective averaged signal charges (signal charge obtained by further reducing the number of pixels) in the third charge storage circuit 204. More specifically, the pixel signal-processing unit 100 stores the signal charge generated by the photoelectric conversion unit 101*a* in the first charge storage circuit 103*a*, stores the signal charge generated by the photoelectric conversion unit 101*b* in the first charge storage circuit 103*b*, stores the signal charge generated by the photoelectric conversion unit 101*c* in the first charge storage circuit 103*c*, and stores the signal charge generated by the photoelectric conversion unit 101*d* in the first charge storage circuit 103*d*. The pixel signal-processing unit 100 stores a signal charge, which is obtained by averaging the signal charge generated by the photoelectric conversion unit 101*a* and the signal charge generated by the photoelectric conversion unit 101*b*, in the second charge storage circuit 104*ab*, and stores a signal charge, which is obtained by averaging the signal charge generated by the photoelectric conversion unit 101*c* and the signal charge generated by the photoelectric conversion unit 101*d*, in the second charge storage circuit 104*cd*. The pixel signal-processing unit 100 stores a signal charge, which is obtained by averaging the signal charges generated by the photoelectric conversion units 101*a* to 101*d*, in the third charge storage circuit 204. Then, the pixel signal-processing unit 100 separately outputs each pixel signal corresponding to the signal charge stored in each first charge storage circuit 103, each pixel signal corresponding to the signal charge stored in the second charge storage circuit 104, and each pixel signal corresponding to the signal charge stored in the third charge storage circuit 204. That is, based on the signal charges obtained by the same one exposure, the pixel signal-processing unit 100 separately outputs each of the pixel signals (total pixel signal S1) of all pixels provided in the pixel signal-processing unit 100, each of the pixel signals (reduced pixel signal S2) obtained by reducing the number of pixels provided in the pixel signal-processing unit 100, and each of the pixel signals (reduced pixel signal S3) obtained by further reducing the number of pixels provided in the pixel signal-processing unit 100.

In the solid-state imaging device 10 according to the first embodiment shown in FIG. 2, the configuration of the pixel signal-processing unit 100 includes the second charge storage circuit 104 that stores a signal charge, which is obtained by averaging the amounts of signal charges generated by the photoelectric conversion units 101 provided in the respective pixels, with two predetermined pixels as a set. In the solid-state imaging device 10 according to the first embodiment shown in FIG. 2, the configuration of the pixel signal-processing unit 100 includes the third charge storage circuit 204 that stores a signal charge, which is obtained by averaging the amounts of signal charges generated by the photoelectric conversion units 101 provided in the respective pixels, with the predetermined second charge storage circuits 104 as a set, that is, with four predetermined pixels as a set. In the actual solid-state imaging device, however, for example, a color filter of the Bayer array is attached to the pixel array in which a plurality of pixels are arranged in a two-dimensional matrix, and the photoelectric conversion unit 101 provided in each pixel generates a signal charge by photoelectrically converting the corresponding color of the attached color filter that is included in the incident light. Therefore, in the solid-state imaging device 10 according to the first embodiment, it is desirable to form a set of pixels so that the center of gravity of the color of the attached color filter is not shifted and the signal charges of different colors are not averaged.

In the pixel signal-processing unit 100 of the solid-state imaging device 10 according to the first embodiment shown in FIG. 2, a configuration is shown in which the second charge storage circuits 104ab and 104cd average the signal charges generated by the corresponding photoelectric conversion units 101a to 101d to reduce the number of pixels. In the pixel signal-processing unit 100 of the solid-state imaging device 10 according to the first embodiment shown in FIG. 2, a configuration is shown in which the third charge storage circuit 204 further averages the signal charges averaged by the second charge storage circuits 104ab and 104cd, that is, the third charge storage circuit 204 averages the signal charges generated by the photoelectric conversion units 101a to 101d to further reduce the number of pixels. However, the method of reducing the number of pixels is not limited to the averaging shown in FIG. 2. For example, a configuration of reducing the number of pixels by thinning out pixels may also be used. In this case, in the pixel signal-processing unit 100 of the solid-state imaging device 10 according to the first embodiment shown in FIG. 2, a configuration can be considered in which the second charge storage circuits 104ab and 104cd store (accumulate) any one of the signal charges generated by the corresponding photoelectric conversion units 101a to 101d to thin out pixels. A configuration can be considered in which the third charge storage circuit 204 stores (accumulates) any one of the signal charges generated by the photoelectric conversion units 101a to 101d to thin out pixels.

Next, the configuration of the first read unit 110 of the solid-state imaging device 10 according to the first embodiment shown in FIG. 2 will be described in more detail. The first read unit 110 of the solid-state imaging device 10 according to the first embodiment shown in FIG. 2 is configured to include the first read control unit 1101, the first A/D conversion unit 1102, a first difference calculation unit 1103, and a first bit number reduction unit 1104.

The first read control unit 1101 sequentially outputs a read control signal, which is for sequentially reading the total pixel signal S1 from each of the first charge storage circuits 103a to 103d in the pixel signal-processing unit 100, to each of the first charge storage circuits 103a to 103d.

The first A/D conversion unit 1102 is an A/D conversion circuit that performs analog-to-digital conversion of the total pixel signal S1 (analog signal), which is read by the first read control unit 1101 and is sequentially input from each of the first charge storage circuits 103a to 103d, and sequentially outputs a value (digital value) indicating the magnitude of each total pixel signal S1 (analog signal) to the first difference calculation unit 1103.

The first difference calculation unit 1103 calculates a difference between the digital value of each total pixel signal S1, which is sequentially input from the first A/D conversion unit 1102, and the digital value of each reduced pixel signal S2, which is sequentially input from the second read unit 120. The first difference calculation unit 1103 sequentially outputs each digital value, which is obtained by calculating the difference, to the first bit number reduction unit 1104. That is, the first difference calculation unit 1103 outputs each digital value, which is obtained by taking the difference between the total pixel signal S1 and the reduced pixel signal S2, to the first bit number reduction unit 1104.

Since the digital value output from the first difference calculation unit 1103 is a digital value obtained by taking the difference between the total pixel signal S1 and the reduced pixel signal S2, there are a case where the digital value is positive and a case where the digital value is negative. Accordingly, the first difference calculation unit 1103 applies a sign indicating a positive digital value or a negative digital value to the output digital value, and outputs the digital value with the sign to the first bit number reduction unit 1104.

As described above, the reduced pixel signal S2 is a pixel signal obtained by reducing the number of pixels of the total pixel signal S1. Therefore, the digital value obtained by the calculation of the difference between the digital value of the total pixel signal S1 and the digital value of the reduced pixel signal S2 by the first difference calculation unit 1103 corresponds to a digital value obtained by extracting the edge components of the total pixel signal S1.

The first bit number reduction unit 1104 reduces the number of bits of the digital value of each total pixel signal S1, which is sequentially input from the first difference calculation unit 1103 and for which a difference has been taken, using a predetermined method. Then, the first bit number reduction unit 1104 outputs the digital value of each total pixel signal S1, which is obtained by reducing the number of bits, to the transmission unit 140. The method used when the first bit number reduction unit 1104 reduces the number of bits of the digital value of the total pixel signal S1 will be described later.

Through the configuration described above, the first read unit 110 reads the total pixel signal S1 stored in each first charge storage circuit 103 in the pixel signal-processing unit 100. Then, the first read unit 110 outputs each digital value, which is obtained by performing analog-to-digital conversion of the read total pixel signal S1, to the transmission unit 140. The first read unit 110 takes a difference between each digital value, which is obtained by performing analog-to-digital conversion of the read total pixel signal S1, and the digital value of the reduced pixel signal S2 input from the second read unit 120. The first read unit 110 reduces the number of bits of each digital value, which is obtained by calculating the difference, and outputs the result to the transmission unit 140. Then, the transmission unit 140 outputs each digital value based on the total pixel signal S1 input from the first read unit 110, as pixel data based on the total pixel signal S1 having the reduced number of bits (hereinafter, referred to as "total pixel data D1"), to the external.

Next, the configuration of the second read unit 120 of the solid-state imaging device 10 according to the first embodiment shown in FIG. 2 will be described in more detail. The second read unit 120 of the solid-state imaging device 10 according to the first embodiment shown in FIG. 2 is configured to include the second read control unit 1201, the second A/D conversion unit 1202, a second difference calculation unit 1203, and a second bit number reduction unit 1204.

The second read control unit 1201 sequentially outputs a read control signal, which is for sequentially reading the reduced pixel signal S2 from each of the second charge storage circuits 104ab and 104cd in the pixel signal-processing unit 100, to each of the second charge storage circuits 104ab and 104cd.

The second A/D conversion unit 1202 is an A/D conversion circuit that performs analog-to-digital conversion of the reduced pixel signal S2 (analog signal), which is read by the second read control unit 1201 and is sequentially input from each of the second charge storage circuits 104ab and 104cd, and sequentially outputs a value (digital value) indicating the magnitude of each reduced pixel signal S2 (analog signal) to the second difference calculation unit 1203. The second A/D conversion unit 1202 sequentially outputs the digital value of the reduced pixel signal S2, which is obtained by performing analog-to-digital conversion, to the first difference calculation unit 1103 in the first read unit 110.

In the case of a configuration in which each of the second charge storage circuits 104ab and 104cd in the pixel signal-processing unit 100 outputs a signal voltage corresponding to the stored signal charge as it is without averaging the signal voltage, the second A/D conversion unit 1202 may sequentially output a digital value of the magnitude, which is obtained by averaging the signal voltage output from each of the second charge storage circuits 104ab and 104cd, to the second difference calculation unit 1203. In this case, the second A/D conversion unit 1202 may perform analog-to-digital conversion of each signal voltage, which is sequentially read from the second charge storage circuits 104ab and 104cd by the second read control unit 1201, after averaging the signal voltage in the state of an analog signal, or may perform the averaging in the state of a digital value after performing analog-to-digital conversion of each signal voltage.

The second difference calculation unit 1203 calculates a difference between the digital value of each reduced pixel signal S2, which is sequentially input from the second A/D conversion unit 1202, and the digital value of each reduced pixel signal S3, which is sequentially input from the third read unit 130. Then, the second difference calculation unit 1203 sequentially outputs each digital value, which is obtained by taking the difference, to the second bit number reduction unit 1204. That is, the second difference calculation unit 1203 outputs each digital value, which is obtained by taking the difference between the reduced pixel signal S2 and the reduced pixel signal S3, to the second bit number reduction unit 1204.

Since the digital value output from the second difference calculation unit 1203 is a digital value obtained by taking the difference between the reduced pixel signal S2 and the reduced pixel signal S3, there are a case where the digital value is positive and a case where the digital value is negative similar to the digital value output from the first difference calculation unit 1103. Accordingly, similar to the first difference calculation unit 1103, the second difference calculation unit 1203 applies a sign indicating a positive digital value or a negative digital value to the output digital value, and outputs the digital value with the sign to the second bit number reduction unit 1204.

As described above, the reduced pixel signal S3 is a pixel signal obtained by reducing the number of pixels of the reduced pixel signal S2. Therefore, the digital value obtained by the calculation of the difference between the digital value of the reduced pixel signal S2 and the digital value of the reduced pixel signal S3 by the second difference calculation unit 1203 corresponds to a digital value obtained by extracting the edge components of the reduced pixel signal S2.

The second bit number reduction unit 1204 reduces the number of bits of the digital value of each reduced pixel signal S2, which is sequentially input from the second difference calculation unit 1203 and for which a difference has been taken, using a predetermined method. Then, the second bit number reduction unit 1204 outputs the digital value of each reduced pixel signal S2, which is obtained by reducing the number of bits, to the transmission unit 140. The method used when the second bit number reduction unit 1204 reduces the number of bits of the digital value of the reduced pixel signal S2 can be considered similar to the method used when the first bit number reduction unit 1104 reduces the number of bits of the digital value of the total pixel signal S1. The method used when the second bit number reduction unit 1204 reduces the number of bits of the digital value of the reduced pixel signal S2 will also be described later.

Through the configuration described above, the second read unit 120 reads the reduced pixel signal S2 stored in each of the second charge storage circuits 104ab and 104cd in the pixel signal-processing unit 100. Then, the second read unit 120 outputs each digital value, which is obtained by performing analog-to-digital conversion of the read reduced pixel signal S2, to the transmission unit 140. The second read unit 120 takes a difference between each digital value, which is obtained by performing analog-to-digital conversion of the read reduced pixel signal S2, and the digital value of the reduced pixel signal S3 input from the third read unit 130. The second read unit 120 reduces the number of bits of each digital value, which is obtained by taking the difference, and outputs the result to the transmission unit 140. Then, the transmission unit 140 outputs each digital value based on the reduced pixel signal S2 input from the second read unit 120, as pixel data based on the reduced pixel signal S2 having the reduced number of bits (hereinafter, referred to as "reduced pixel data D2"), to the external.

Next, the configuration of the third read unit 130 of the solid-state imaging device 10 according to the first embodiment shown in FIG. 2 will be described in more detail. The third read unit 130 of the solid-state imaging device 10 according to the first embodiment shown in FIG. 2 is configured to include the third read control unit 1301 and the third A/D conversion unit 1302.

The third read control unit 1301 sequentially outputs a read control signal, which is for sequentially reading the reduced pixel signal S3 from the third charge storage circuit 204 in the pixel signal-processing unit 100, to the third charge storage circuit 204.

The third A/D conversion unit 1302 is an A/D conversion circuit that performs analog-to-digital conversion of the reduced pixel signal S3 (analog signal), which is read by the third read control unit 1301 and is sequentially input from the third charge storage circuit 204, and sequentially outputs a value (digital value) indicating the magnitude of each reduced pixel signal S3 (analog signal) to the transmission unit 140. That is, the third A/D conversion unit 1302 is an A/D conversion circuit that sequentially outputs the digital value of each reduced pixel signal S3 to the transmission unit 140 without reducing the number of bits of the digital value of the reduced pixel signal S3. The third A/D conversion unit 1302 sequentially outputs the digital value of the reduced pixel signal S3, which is obtained by performing analog-to-digital conversion, to the second difference calculation unit 1203 in the second read unit 120.

In the case of a configuration in which the third charge storage circuit 204 in the pixel signal-processing unit 100 outputs a signal voltage corresponding to the stored signal charge as it is without averaging the signal voltage, the third A/D conversion unit 1302 may sequentially output a digital value of the magnitude, which is obtained by averaging the signal voltage output from the third charge storage circuit 204, to the transmission unit 140. In this case, the third A/D conversion unit 1302 may perform analog-to-digital conversion of each signal voltage, which is sequentially read from the third charge storage circuit 204 by the third read control unit 1301, after averaging the signal voltage in the state of an analog signal, or may perform the averaging in the state of a digital value after performing analog-to-digital conversion of each signal voltage.

Through the configuration described above, the third read unit 130 reads the reduced pixel signal S3 stored in the third charge storage circuit 204 in the pixel signal-processing unit 100. Then, the third read unit 130 outputs each digital value, which is obtained by performing analog-to-digital conversion of the read reduced pixel signal S3, to the transmission unit 140 as it is. Then, the transmission unit 140 outputs each digital value based on the reduced pixel signal S3 input from the third read unit 130, as pixel data based on the reduced pixel signal S3 (hereinafter, referred to as "reduced pixel data D3"), to the external.

For the configuration described above, in the solid-state imaging device 10 according to the first embodiment, the third read unit 130 reads the reduced pixel signal S3 first. Then, in the solid-state imaging device 10 according to the first embodiment, each digital value obtained by performing analog-to-digital conversion of the read reduced pixel signal S3 is output to the second read unit 120 and the transmission unit 140. In the solid-state imaging device 10 according to the first embodiment, the second read unit 120 reads the reduced pixel signal S2 next. Then, in the solid-state imaging device 10 according to the first embodiment, each digital value obtained by performing analog-to-digital conversion of the read reduced pixel signal S2 is output to the first read unit 110, and the number of bits of the digital value obtained by taking the difference between the digital value of the reduced pixel signal S2 and the digital value of the reduced pixel signal S3 is reduced and the result is outputs to the transmission unit 140. In the solid-state imaging device 10 according to the first embodiment, the first read unit 110 reads the total pixel signal S1 last. Then, the number of bits of the digital value obtained by taking the difference between each digital value, which is obtained by performing analog-to-digital conversion of the read total pixel signal S1, and the digital value of the reduced pixel signal S2 is reduced, and the result is output to the transmission unit 140. In the solid-state imaging device 10 according to the first embodiment, the transmission unit 140 outputs the reduced pixel data D3 based on the reduced pixel signal S3 first, outputs the reduced pixel data D2 based on the reduced pixel signal S2 next, and outputs the total pixel data D1 based on the total pixel signal S1 last.

In the solid-state imaging device 10 according to the first embodiment, the timing of outputting each piece of pixel data will be described. FIG. 3 is a diagram showing the output sequence of pixel data in the solid-state imaging device 10 according to the first embodiment. In the solid-state imaging device 10 according to the first embodiment, the reduced pixel data D3, the reduced pixel data D2, and the total pixel data D1 are transmitted (output) in a time-division manner as in the output sequence of pixel data shown in FIG. 3.

More specifically, when the solid-state imaging device 10 outputs each piece of pixel data, first, the third read control unit 1301 in the third read unit 130 sequentially outputs a read control signal, which is for sequentially reading the reduced pixel signal S3 of one frame, to the third charge storage circuit 204 in the pixel signal-processing unit 100. Accordingly, the reduced pixel signal S3 of one frame is sequentially output from the third charge storage circuit 204, and is sequentially input to the third A/D conversion unit 1302. Then, the third A/D conversion unit 1302 sequentially outputs the digital value of the reduced pixel signal S3 of one frame, which is obtained by performing analog-to-digital conversion of the reduced pixel signal S3 (analog signal) that is sequentially input, to the transmission unit 140 as it is. Then, the transmission unit 140 sequentially transmits (outputs) the reduced pixel data D3 of one frame based on the reduced pixel signal S3 of one frame, as pixel data, to the external.

The third A/D conversion unit 1302 sequentially outputs the digital value of the reduced pixel signal S3 of one frame, which is obtained by performing analog-to-digital conversion, to the second difference calculation unit 1203 in the second read unit 120. The second read control unit 1201 in the second read unit 120 sequentially outputs a read control signal, which is for sequentially reading the reduced pixel signal S2 corresponding to the digital value of the reduced pixel signal S3 output from the third A/D conversion unit 1302 in the third read unit 130, to each of the second charge storage circuits 104*ab* and 104*cd* in the pixel signal-processing unit 100. Accordingly, the reduced pixel signal S2 of one frame corresponding to the digital value of each reduced pixel signal S3 is sequentially output from each of the second charge storage circuits 104*ab* and 104*cd*, and is sequentially input to the second A/D conversion unit 1202. Then, the second A/D conversion unit 1202 sequentially outputs the digital value of the reduced pixel signal S2, which is obtained by performing analog-to-digital conversion of the reduced pixel signal S2 (analog signal) that is sequentially input, to the second difference calculation unit 1203.

Then, the second difference calculation unit 1203 sequentially outputs each digital value, which is obtained by taking the difference between the digital value of each reduced pixel signal S2 sequentially input from the second A/D conversion unit 1202 and the digital value of each reduced pixel signal S3 sequentially input from the third A/D conversion unit 1302 in the third read unit 130, to the second bit number reduction unit 1204. Then, the second bit number reduction unit 1204 reduces the number of bits of the digital value of the reduced pixel signal S2, which is sequentially input from the second difference calculation unit 1203 and for which a difference has been taken, using a predetermined method, and sequentially outputs the result to the transmission unit 140. Then, the transmission unit 140 sequentially transmits (outputs) the reduced pixel data D2 of one frame based on the reduced pixel signal S2 of one frame, as pixel data, to the external.

The second A/D conversion unit 1202 sequentially outputs the digital value of the reduced pixel signal S2 of one frame, which is obtained by performing analog-to-digital conversion, to the first difference calculation unit 1103 in the first read unit 110. The first read control unit 1101 in the first read unit 110 sequentially outputs a read control signal, which is for sequentially reading the total pixel signal S1 corresponding to the digital value of the reduced pixel signal S2 output from the second A/D conversion unit 1202 in the second read unit 120, to each of the first charge storage circuits 103*a* to 103*d* in the pixel signal-processing unit 100. Accordingly, the total pixel signal S1 of one frame corresponding to the digital value of each reduced pixel signal S2 is sequentially output from each of the first charge storage circuits 103*a* to 103*d*, and is sequentially input to the first A/D conversion unit 1102. Then, the first A/D conversion unit 1102 sequentially outputs the digital value of the total pixel signal S1, which is obtained by performing analog-todigital conversion of the total pixel signal S1 (analog signal) that is sequentially input, to the first difference calculation unit 1103.

Then, the first difference calculation unit 1103 sequentially outputs each digital value, which is obtained by taking the difference between the digital value of the total pixel signal S1 sequentially input from the first A/D conversion unit 1102 and the digital value of the reduced pixel signal S2 sequentially input from the second A/D conversion unit 1202 in the second read unit 120, to the first bit number reduction unit 1104. Then, the first bit number reduction unit 1104 reduces the number of bits of the digital value of the total pixel signal S1, which is sequentially input from the first difference calculation unit 1103 and for which a difference has been taken, using a predetermined method, and sequentially outputs the result to the transmission unit 140. Then, the transmission unit 140 sequentially transmits (outputs) the total pixel data D1 of one frame based on the total pixel signal S1 of one frame, as pixel data, to the external.

The reduced pixel signal S2 is a pixel signal obtained by reducing the number of pixels arranged in the pixel array, and the reduced pixel signal S3 is a pixel signal obtained by further reducing the number of pixels arranged in the pixel array. Therefore, for example, even in a case where the reading of the total pixel signal S1, the reduced pixel signal S2, and the reduced pixel signal S3 is started at the same time, the reading of the reduced pixel signal S2 obtained by reducing the number of pixels can be completed more quickly than the reading of the total pixel signal S1 for which the number of pixels is not reduced. The reading of the reduced pixel signal S3 obtained by further reducing the number of pixels can be completed more quickly than the reading of the reduced pixel signal S2 obtained by reducing the number of pixels. Thus, in the solid-state imaging device 10 according to the first embodiment shown in FIG. 2, the reading of the reduced pixel signal S3 and the output of the digital value of the reduced pixel signal S3 in the third read unit 130, the reading of the reduced pixel signal S2, the calculation of the difference between the digital values of the reduced pixel signals S2, and the reduction in the number of bits in the second read unit 120, and the reading of the total pixel signal S1, the calculation of the difference between the digital values of the total pixel signals S1, and the reduction in the number of bits in the first read unit 110 are performed in parallel. Therefore, the pixel data from the transmission unit 140 can be sequentially transmitted (output) to the imaging-processing unit 210 in the image-processing unit 20.

Thus, in the solid-state imaging device 10 according to the first embodiment, pixel data is transmitted (output) in a time-division manner. Accordingly, in the imaging system 1 in which the solid-state imaging device 10 according to the first embodiment is mounted, the image-processing unit 20 can properly use the pixel data output from the solid-state imaging device 10 depending on each process. That is, in the imaging system 1 in which the solid-state imaging device 10 according to the first embodiment is mounted, it is possible to perform the processing using the pixel data of the number of pixels suitable for the processing of each component provided in the image-processing unit 20.

In the pixel data output from the solid-state imaging device 10, the reduced pixel data D2 based on the reduced pixel signal S2 and the total pixel data D1 based on the total pixel signal S1 are pixel data obtained by reducing the number of bits after taking the difference. Therefore, in each process of the image-processing unit 20, the pixel data output from the solid-state imaging device 10 is used in each process after being restored.

Figure 4A:
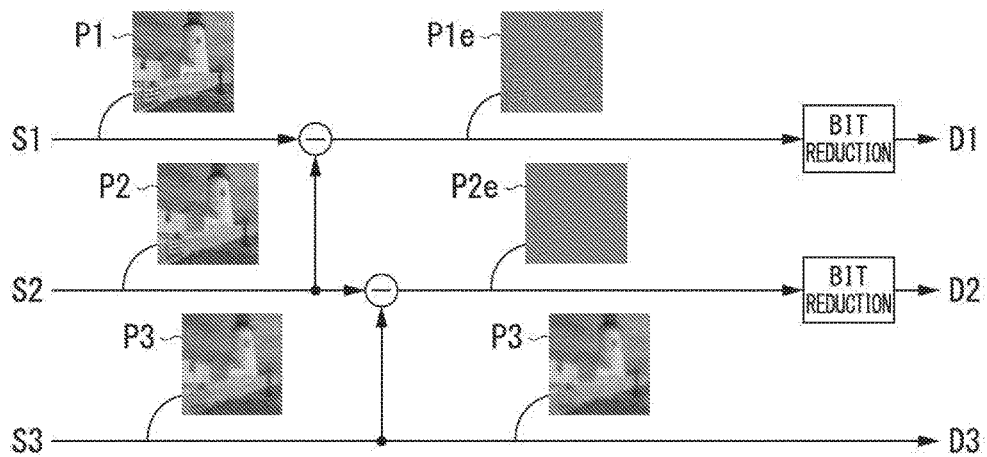
FIG. 4A is a diagram showing the processing when the solid-state imaging device according to the first embodiment of the present invention outputs pixel data in a simplified manner.
Figure 4B:
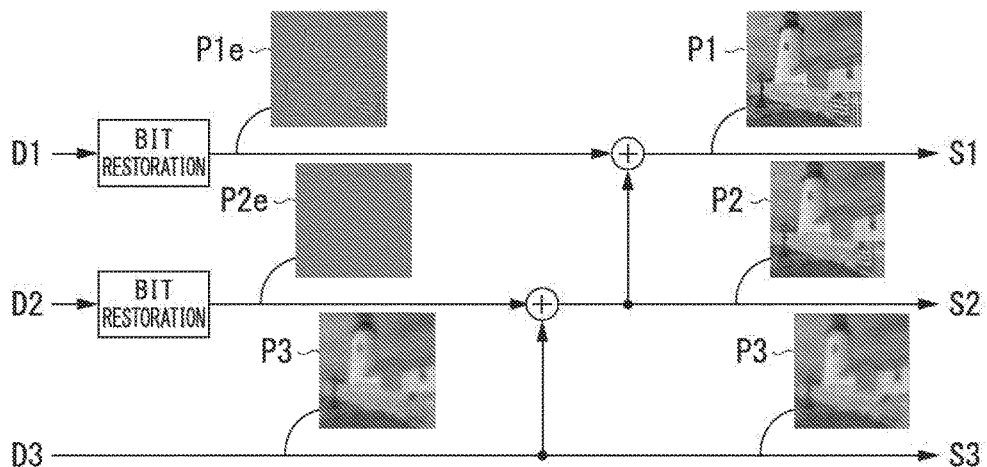
FIG. 4B is a diagram showing an example of a method of restoring pixel data output from the solid-state imaging device according to the first embodiment of the present invention in a simplified manner.

Here, the relationship between the respective pieces of pixel data output from the solid-state imaging device 10 according to the first embodiment and an example of a method of restoring the pixel data in the image-processing unit 20 will be described. FIG. 4A is a diagram showing the processing when the solid-state imaging device 10 according to the first embodiment outputs pixel data in a simplified manner. FIG. 4B is a diagram showing an example of the processing when the image-processing unit 20 restores the pixel data output from the solid-state imaging device 10 according to the first embodiment in a simplified manner. In FIGS. 4A and 4B, for simplicity of explanation, signal lines of the digital value of the total pixel signal S1, the digital value of the reduced pixel signal S2, and the digital value of the reduced pixel signal S3 are shown as "S1", "S2", and "S3", respectively.

As described above, the pixel signal-processing unit 100 of the solid-state imaging device 10 separately outputs the total pixel signal S1 corresponding to the image P1 having a largest number of pixels, the reduced pixel signal S2 corresponding to the image P2 having a smaller number of pixels than the image P1, and the reduced pixel signal S3 corresponding to the image P3 having a smallest number of pixels. Then, the third read unit 130 of the solid-state imaging device 10 outputs each digital value, which is obtained by performing analog-to-digital conversion of the reduced pixel signal S3 read from the pixel signal-processing unit 100, to the transmission unit 140 as it is. The transmission unit 140 of the solid-state imaging device 10 transmits (outputs) the reduced pixel data D3 based on the reduced pixel signal S3 to the imaging-processing unit 210 in the image-processing unit 20.

The second read unit 120 of the solid-state imaging device 10 takes a difference between each digital value, which is obtained by performing analog-to-digital conversion of the reduced pixel signal S2 read from the pixel signal-processing unit 100, and the digital value of the reduced pixel signal S3. Here, the image based on the digital value obtained by taking the difference is an image obtained by extracting the edge components of the image P2 as in an image P2e shown in FIG. 4A. Then, the second read unit 120 reduces the number of bits of the digital value obtained by taking the difference and outputs the result to the transmission unit 140, and the transmission unit 140 transmits (outputs) the reduced pixel data D2 based on the reduced pixel signal S2 to the imaging-processing unit 210 in the image-processing unit 20.

The first read unit 110 of the solid-state imaging device 10 takes a difference between each digital value, which is obtained by performing analog-to-digital conversion of the total pixel signal S1 read from the pixel signal-processing unit 100, and the digital value of the reduced pixel signal S2. Here, the image based on the digital value obtained by taking the difference is an image obtained by extracting the edge components of the image P1 as in an image P1e shown in FIG. 4A. Then, the first read unit 110 reduces the number of bits of the digital value obtained by taking the difference and outputs the result to the transmission unit 140, and the transmission unit 140 transmits (outputs) the total pixel data D1 based on the total pixel signal S1 to the imaging-processing unit 210 in the image-processing unit 20.

When the image-processing unit 20 restores the pixel data output from the solid-state imaging device 10, the imaging-processing unit 210 in the image-processing unit 20 performs processing reverse to the processing when the solid-state imaging device 10 outputs the pixel data. More specifically, the reduced pixel data D3 transmitted (output) from the solid-state imaging device 10 is processed as it is. This is because the reduced pixel data D3 is a digital value based on the reduced pixel signal S3, that is, pixel data for which no difference has been taken. Accordingly, processing for restoration is not necessary.

The imaging-processing unit 210 in the image-processing unit 20 restores the number of bits of the reduced pixel data D2 transmitted (output) from the solid-state imaging device 10. Here, the image based on the restored digital value is the same image as the image P2e shown in FIG. 4A, which is obtained by extracting the edge components of the image P2, as in the image P2e shown in FIG. 4B. Then, the imaging-processing unit 210 restores the digital value of the reduced pixel signal S2 corresponding to the image P2 by adding the digital value of the reduced pixel signal S3 to the digital value obtained by restoring the number of bits, and performs processing using the restored digital value of the reduced pixel signal S2.

The imaging-processing unit 210 in the image-processing unit 20 restores the number of bits of the total pixel data D1 transmitted (output) from the solid-state imaging device 10. Here, the image based on the restored digital value is the same image as the image P1e shown in FIG. 4A, which is obtained by extracting the edge components of the image P1, as in the image P1e shown in FIG. 4B. Then, the imaging-processing unit 210 restores the digital value of the total pixel signal S1 corresponding to the image P1 by adding the restored digital value of the reduced pixel signal S2 to the digital value obtained by restoring the number of bits, and performs processing using the restored digital value of the total pixel signal S1.

Thus, the imaging-processing unit 210 in the image-processing unit 20 can restore the pixel data output from the solid-state imaging device 10 to pixel data showing the original image by performing processing reverse to the processing when the solid-state imaging device 10 outputs the pixel data. That is, the imaging-processing unit 210 in the image-processing unit 20 can restore the total pixel signal S1 corresponding to the image P1 having a largest number of pixels, the reduced pixel signal S2 corresponding to the image P2 having a smaller number of pixels than the image P1, and the reduced pixel signal S3 corresponding to the image P3 having a smallest number of pixels, which are separately output from the pixel signal-processing unit 100 of the solid-state imaging device 10.

In each process of the image-processing unit 20, the pixel data output from the solid-state imaging device 10 can also be used in the processing as it is. For example, in the processing performed after extracting edge components included in an image, it is possible to shorten the processing time required for extracting the edge components by using the pixel data output from the solid-state imaging device 10 as it is. For this reason, in the imaging-processing unit 210 in the image-processing unit 20, it is not always necessary to restore the pixel data output from the solid-state imaging device 10.

Figure 5A:
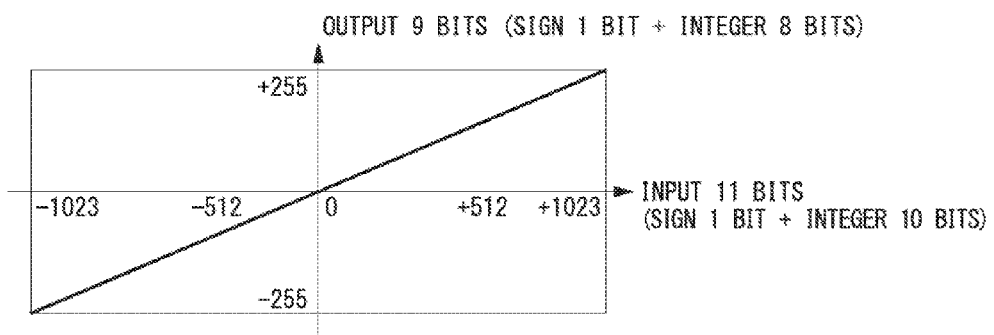
FIG. 5A is a diagram illustrating a method of reducing the number of bits of pixel data in the solid-state imaging device according to the first embodiment of the present invention.
Figure 5B:
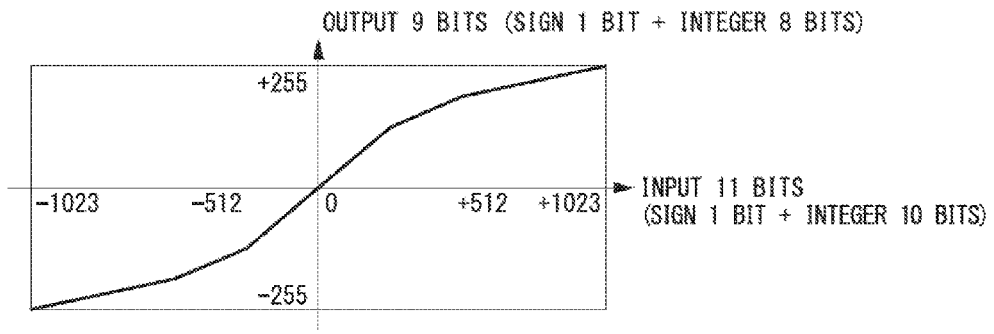
FIG. 5B is a diagram illustrating a method of reducing the number of bits of pixel data in the solid-state imaging device according to the first embodiment of the present invention.

Next, a method of reducing the number of bits of the digital value of pixel data in the solid-state imaging device 10 according to the first embodiment will be described. FIGS. 5A and 5B are diagrams illustrating the method of reducing the number of bits of pixel data in the solid-state imaging device 10 according to the first embodiment. In the following explanation, an example will be described in which the first A/D conversion unit 1102 performs analog-to-digital conversion of the input total pixel signal S1 (analog signal) to the digital value of 10 bits and the first difference calculation unit 1103 reduces the number of bits of the digital value of the total pixel signal S1 obtained by applying a 1-bit sign indicating a positive digital value or a negative digital value to the digital value that is output after taking the difference. That is, in the following explanation, an example will be described in which the first bit number reduction unit 1104 reduces the number of bits of the digital value of the 11-bit total pixel signal S1 configured to include the 1-bit sign and the 10-bit value (integer).

FIG. 5A shows a reduction example in the case of uniformly reducing the number of bits of the digital value of the total pixel signal S1, and FIG. 5B shows a reduction example in the case of changing the number of bits to be reduced according to the magnitude of the digital value of the total pixel signal S1.

In the case of uniformly reducing the number of bits of the digital value of the total pixel signal S1, the first bit number reduction unit 1104 reduces the number of bits of the digital value of the 10-bit integer part in the digital value, which is input from the first difference calculation unit 1103 after taking the difference, from 10 bits to 8 bits, as shown in FIG. 5A. For example, the first bit number reduction unit 1104 outputs a 9-bit digital value obtained by applying the 1-bit sign to the 8-bit digital value that is obtained by reducing the lower two bits by dividing the input digital value of the 10-bit integer part by 4, as a digital value (total pixel data D1) of the total pixel signal S1 with the reduced number of bits, to the transmission unit 140. In the method of reducing the number of bits shown in FIG. 5A, the integer part of the input digital value is just divided by a predetermined value (in FIGS. 5A, 4). Therefore, it is possible to simplify the circuit configuration of the first bit number reduction unit 1104.

In the case of changing the number of bits to be reduced according to the magnitude of the digital value of the total pixel signal S1, the first bit number reduction unit 1104 decreases the number of bits to be reduced in a case where the digital value that is input from the first difference calculation unit 1103 after taking the difference is a value close to 0, and increases the number of bits to be reduced in a case where the digital value that is input after taking the difference is a value distant from 0, as shown in FIG. 5B. That is, the number of bits to be reduced is decreased in a case where the difference between the digital value of the total pixel signal S1 and the digital value of the reduced pixel signal S2 is small, and the number of bits to be reduced is increased in a case where the difference between the digital value of the total pixel signal S1 and the digital value of the reduced pixel signal S2 is large. For example, the first bit number reduction unit 1104 outputs a 9-bit digital value obtained by applying the 1-bit sign to the 8-bit digital value that is obtained by reducing the lower one to four bits of the input digital value of the 10-bit integer part according to the value of the digital value of the 10-bit integer part, as a digital value (total pixel data D1) of the total pixel signal S1 with the reduced number of bits, to the transmission unit 140. The method of reducing the number of bits shown in FIG. 5B is effective in a case of not lowering the reproducibility of smooth gradation (for example, gradation or the like) in an image generated based on the total pixel data D1 with the reduced number of bits.

As shown in FIG. 5B, in the case of changing the number of bits to be reduced according to the magnitude of the digital value of the total pixel signal S1, information of the number of bits that have been reduced is required when restoring the number of bits in the imaging-processing unit 210. For example, the information of the number of bits that have been reduced can be obtained by making the imaging-processing unit 210 perform the same processing as the processing of reducing the number of bits, which is performed by the first bit number reduction unit 1104, based on the digital value of the reduced pixel signal S2 that is restored after being output from the solid-state imaging device 10 according to the first embodiment first. When the solid-state imaging device 10 according to the first embodiment outputs the total pixel data D1 with the reduced number of bits, information of the number of bits that have been reduced may be added. In this case, for example, the information of the number of bits that have been reduced, which is included in the information of the header or footer of the total pixel data D1 to be transmitted using an LVDS method, may be transmitted together with the total pixel data D1. For example, in order to set the operation of the solid-state imaging device 10 according to the first embodiment, information of the number of bits that have been reduced may be transmitted using serial communication or a register accessed by the CPU 260 in the image-processing unit 20 provided in the imaging system 1 in which the solid-state imaging device 10 is mounted.

Thus, the first bit number reduction unit 1104 reduces the number of bits of the digital value of the total pixel signal S1 obtained by taking the difference by the first difference calculation unit 1103, that is, the number of bits of the digital value (total pixel data D1) obtained by extracting the edge components of the total pixel signal S1. For the reduction in the number of bits for the digital value of the edge component, small degradation of the image quality is generally known so that the similar concept is also applied in JPEG compression processing that is still image compression processing. Accordingly, in the solid-state imaging device 10 according to the first embodiment, it is possible to reduce power consumption when outputting the total pixel data D1 while suppressing image quality degradation. Then, in the imaging system 1 in which the solid-state imaging device 10 according to the first embodiment is mounted, it is possible to reduce the amount of total pixel data D1 transmitted between the solid-state imaging device 10 and the image-processing unit 20.

The method of reducing the number of bits of the digital value (total pixel data D1) of the total pixel signal S1 in the first bit number reduction unit 1104 is not limited to the method shown in FIGS. 5A and 5B, and the number of bits may be reduced using other methods. The number of bits of the digital value of the total pixel signal S1 or the number of bits to be reduced is not limited to the number of bits shown in FIGS. 5A and 5B, and even the digital value (total pixel data D1) of the total pixel signal S1 having the other number of bits can be similarly considered.

In the method of reducing the number of bits of the digital value (reduced pixel data D2) of the reduced pixel signal S2 in the second bit number reduction unit 1204, only the pixel data for which the number of bits is to be reduced is changed to the reduced pixel data D2. Accordingly, the method of reducing the number of bits of the digital value (reduced pixel data D2) of the reduced pixel signal S2 in the second bit number reduction unit 1204 can be considered similar to the method of reducing the number of bits of the digital value (total pixel data D1) of the total pixel signal S1 in the first bit number reduction unit 1104 described above. That is, by reducing the number of bits of the reduced pixel data D2 using the same reduction method also in the second bit number reduction unit 1204, the amount of reduced pixel data D2 transmitted between the solid-state imaging device 10 and the image-processing unit 20 can be reduced in the imaging system 1 in which the solid-state imaging device 10 according to the first embodiment is mounted. Therefore, detailed explanation regarding the method of reducing the number of bits of the digital value (reduced pixel data D2) of the reduced pixel signal S2 in the second bit number reduction unit 1204 will be omitted.

In the solid-state imaging device 10 according to the first embodiment, the method of reducing the number of bits of the total pixel data D1 in the first bit number reduction unit 1104 and the method of reducing the number of bits of the reduced pixel data D2 in the second bit number reduction unit 1204 may be the same bit number reduction method, or may be different bit number reduction methods for the respective pieces of pixel data. In the solid-state imaging device 10 according to the first embodiment, the method of reducing the number of bits of the reduced pixel data D2 may be a different bit number reduction method for each reduced pixel signal S2, that is, for each range (region) of a predetermined set of pixels for reducing pixels provided in the pixel signal-processing unit 100 of the solid-state imaging device 10.

As described above, in the solid-state imaging device 10 according to the first embodiment, the total pixel signal S1 that is pixel signals of all pixels provided in the pixel signal-processing unit 100, the reduced pixel signal S2 that is a pixel signal obtained by reducing the number of pixels provided in the pixel signal-processing unit 100, and the reduced pixel signal S3 that is a pixel signal obtained by further reducing the number of pixels provided in the pixel signal-processing unit 100 are separately output from the pixel signal-processing unit 100 based on the signal charges obtained by the same one exposure. Then, in the solid-state imaging device 10 according to the first embodiment, the digital value (reduced pixel data D3) of the reduced pixel signal S3, the reduced pixel data D2 based on the reduced pixel signal S2 obtained by taking the difference between the digital value of the reduced pixel signal S2 and the digital value of the reduced pixel signal S3 and reducing the number of bits, and the total pixel data D1 based on the total pixel signal S1 obtained by taking the difference between the digital value of the total pixel signal S1 and the digital value of the reduced pixel signal S2 and reducing the number of bits are output. Therefore, in the solid-state imaging device 10 according to the first embodiment, it is possible to output the pixel data of the various numbers of pixels, such as the reduced pixel data D3, the reduced pixel data D2, and the total pixel data D1, while suppressing an increase in the amount of data.

In the solid-state imaging device 10 according to the first embodiment, the digital value of the reduced pixel signal S3 is output as the reduced pixel data D3 as it is, the digital value of the reduced pixel signal S2 is output as the reduced pixel data D2 after taking the difference and reducing the number of bits, and the digital value of the total pixel signal S1 is output as the total pixel data D1 after taking the difference and reducing the number of bits. That is, in the solid-state imaging device 10 according to the first embodiment, pixel data with a large number of pixels is output after reducing the number of bits, and pixel data with a small number of pixels is output without reducing the number of bits. Therefore, in the imaging system 1 in which the solid-state imaging device 10 according to the first embodiment is mounted, it is possible to reduce the amount of pixel data transmitted between the solid-state imaging device 10 and the image-processing unit 20. Thus, in the imaging system 1 of the present embodiment in which the solid-state imaging device 10 according to the first embodiment is mounted, each component provided in the image-processing unit 20 that performs processing according to the operation mode of the imaging system 1 can perform the processing using the pixel data of the number of pixels suitable for the processing.

Here, the amount of pixel data transmitted between the solid-state imaging device 10 and the image-processing unit 20 will be described. FIGS. 6A and 6B are tables summarizing the relationship between the number of bits and the number of pixels of pixel data in the solid-state imaging device 10 according to the first embodiment. FIGS. 6A and 6B show the relationship between the digital value and the number of pixels of each of the total pixel signal S1, the reduced pixel signal S2, and the reduced pixel signal S3 in a case where 5760 pixels by 4320 pixels are arranged in the horizontal and vertical directions of the pixel signal-processing unit 100 in the solid-state imaging device 10. FIG. 6A shows an example of the relationship between the number of pixels and the digital value in a case where the ratio between the number of pieces of pixel data in the horizontal direction, which are output from the solid-state imaging device 10, and the number of pieces of pixel data in the vertical direction, a so-called aspect ratio corresponds to 4:3 that is generally adopted in a still image. FIG. 6B shows an example of the relationship between the number of pixels and the digital value in a case where the aspect ratio of pixel data output from the solid-state imaging device 10 corresponds to 16:9 that is generally adopted in a moving image. The following explanation will be given with one bit of the digital value of one pixel as a piece of pixel data.

By reducing the number of bits when the solid-state imaging device 10 outputs each piece of pixel data as shown in FIGS. 6A and 6B, it is possible to reduce the amount of pixel data transmitted between the solid-state imaging device 10 and the image-processing unit 20 compared with a case of outputting pixel data without reducing the number of bits.

As shown in FIG. 6A, the total number of output bits (the total number of pixels×the number of output bits) in the case of outputting the total pixel data D1 in 14 bits without reducing the number of bits of the digital value of the total pixel signal S1 is 24.9 Mpixel×14 bit=348.4 Mbit, but the total number of output bits when outputting the total pixel data D1 in 10 bits by reducing the number of bits is 24.9 Mpixel×10 bit=248.8 Mbit. Similarly, the total number of output bits in the case of outputting the reduced pixel data D2 in 14 bits without reducing the number of bits of the digital value of the reduced pixel signal S2 is 38.7 Mbit, and the total number of output bits when outputting the reduced pixel data D2 in 12 bits by reducing the number of bits is 33.2 Mbit. Since the digital value of the reduced pixel signal S3 is output as the reduced pixel data D3 having 14 bits without reducing the number of bits, there is no change in 4.3 Mbit. Thus, in the example shown in FIG. 6A, the amount of data when the solid-state imaging device 10 transmits (outputs) the pixel data to the image-processing unit 20 is reduced to 286.3 Mbit from 391.4 Mbit when transmitting (outputting) the pixel data without reducing the number of bits, that is, reduced to the amount of data of about 73% by reducing the number of bits of the total pixel data D1 and the reduced pixel data D2.

As shown in FIG. 6B, the total number of output bits in the case of outputting the total pixel data D1 in 14 bits without reducing the number of bits of the digital value of the total pixel signal S1 is 18.7 Mpixel×14 bit=261.3 Mbit, but the total number of output bits when outputting the reduced pixel data D2 in 12 bits by reducing the number of bits is 18.7 Mpixel×10 bit=186.6 Mbit. Similarly the total number of output bits in the case of outputting the reduced pixel data D2 in 14 bits without reducing the number of bits of the digital value of the reduced pixel signal S2 is 29.0 Mbit, and the total number of output bits when outputting the reduced pixel data D2 in 12 bits by reducing the number of bits is 24.9 Mbit. Also in the example shown in FIG. 6B, since the digital value of the reduced pixel signal S3 is output as the reduced pixel data D3 having 14 bits without reducing the number of bits, there is no change in 3.2 Mbit. Thus, in the example shown in FIG. 6B, the amount of data when the solid-state imaging device 10 transmits (outputs) the pixel data to the image-processing unit 20 is reduced to 214.7 Mbit from 293.5 Mbit when transmitting (outputting) the pixel data without reducing the number of bits, that is, reduced to the amount of data of about 73% by reducing the number of bits of the total pixel data D1 and the reduced pixel data D2.

In the solid-state imaging device 10 according to the first embodiment, as shown in FIG. 3, pixel data is transmitted (output) to the imaging-processing unit 210 in the image-processing unit 20 in order of the reduced pixel data D3, the reduced pixel data D2, and the total pixel data D1. That is, in the output sequence of the pixel data shown in FIG. 3, the reduced pixel data D3, the reduced pixel data D2, and the total pixel data D1 are transmitted (output) in a time-division manner. However, one or a plurality of pieces of pixel data of the total pixel data D1, the reduced pixel data D2, and the reduced pixel data D3 cannot be transmitted (output) to the imaging-processing unit 210 in the image-processing unit 20. Whether to transmit (output) the pixel data is changed according to the operation mode of the imaging system 1 in which the solid-state imaging device 10 is mounted, for example. Therefore, in the solid-state imaging device 10 according to the first embodiment, in a case where any component provided in the image-processing unit 20 does not perform processing, the amount of pixel data transmitted between the solid-state imaging device 10 and the image-processing unit 20 can be further reduced.

Here, the amount of data in the case of changing the pixel data transmitted between the solid-state imaging device 10 and the image-processing unit 20 according to the operation mode of the imaging system 1 in which the solid-state imaging device 10 is mounted will be described. FIGS. 7A to 7D are tables summarizing the relationship between the number of bits and the number of pixels of pixel data in the solid-state imaging device 10 according to the first embodiment. FIGS. 7A to 7D show the relationship between the digital value and the number of pixels of each of the total pixel signal S1, the reduced pixel signal S2, and the reduced pixel signal S3 in a case where 5760 pixels by 4320 pixels are arranged in the horizontal and vertical directions of the pixel signal-processing unit 100 in the solid-state imaging device 10. FIG. 7A shows an example of the relationship between the number of pixels and the digital value in a case where the operation mode of the imaging system 1 in which the solid-state imaging device 10 is mounted is an operation mode to capture a still image. FIG. 7B shows an example of the relationship between the number of pixels and the digital value in a case where the operation mode of the imaging system 1 in which the solid-state imaging device 10 is mounted is an operation mode to capture a moving image. FIG. 7C shows an example of the relationship between the number of pixels and the digital value in a case where the operation mode of the imaging system 1 in which the solid-state imaging device 10 is mounted is an operation mode to output a live view image. FIG. 7D shows an example of the relationship between the number of pixels and the digital value in a case where the operation mode of the imaging system 1 in which the solid-state imaging device 10 is mounted is an operation mode to control AE, AF, AWB, and the like. The following explanation will also be given with one bit of the digital value of one pixel as a piece of pixel data.

In the imaging system 1 in which the solid-state imaging device 10 is mounted, each component in the image-processing unit 20 performs processing based on preprocessed image data obtained by preprocessing the pixel data transmitted (output) from the solid-state imaging device 10 by the imaging-processing unit 210 in the image-processing unit 20. In the following explanation, however, for the simplicity of explanation, an example will be described in which each component in the image-processing unit 20 performs processing using the corresponding pixel data. More specifically, an example will be described in which the still image-processing unit 221 in the image-processing unit 20 performs image processing for recording a still image using the total pixel data D1 of the aspect ratio=4:3 based on the total pixel signal S1 and the moving image-processing unit 222 in the image-processing unit 20 performs image processing for recording a moving image using the reduced pixel data D2 of the aspect ratio=16:9 based on the reduced pixel signal S2. An example will be described in which the display-processing unit 230 in the image-processing unit 20 performs display processing for displaying a live view image on the display device 30 using the reduced pixel data D2 of the aspect ratio=4:3 based on the reduced pixel signal S2 and the evaluation value-generating unit 211 in the image-processing unit 20 performs processing for generating an evaluation value for controlling AE, AF, AWB, and the like using the reduced pixel data D3 of the aspect ratio=4:3 based on the reduced pixel signal S3.

As shown in FIGS. 7A to 7D, the amount of pixel data transmitted between the solid-state imaging device 10 and the image-processing unit 20 can be reduced by changing the pixel data output from the solid-state imaging device 10 according to the operation mode of the imaging system 1 in which the solid-state imaging device 10 is mounted.

In the operation mode to capture a still image shown in FIG. 7A, the solid-state imaging device 10 transmits (outputs) the 10-bit total pixel data D1 (the total number of output bits=248.8 Mbit) obtained by reducing the number of bits, the 12-bit reduced pixel data D2 (the total number of output bits=33.2 Mbit) obtained by reducing the number of bits, and the 14-bit reduced pixel data D3 (the total number of output bits=4.3 Mbit) for which the number of bits has not been reduced. Therefore, in the operation mode to capture a still image, the amount of data when the solid-state imaging device 10 transmits (outputs) the pixel data to the image-processing unit 20 is 286.3 Mbit.

In contrast, in the operation mode to capture a moving image shown in FIG. 7B, the still image-processing unit 221 in the image-processing unit 20 does not perform image processing using the total pixel data D1 with the largest number of pixels. Accordingly, the solid-state imaging device 10 does not transmit (output) the total pixel data D1 to the imaging-processing unit 210 in the image-processing unit 20. Then, the solid-state imaging device 10 transmits (outputs) the 12-bit reduced pixel data D2 (the total number of output bits=24.9 Mbit) obtained by reducing the number of bits and the 14-bit reduced pixel data D3 (the total number of output bits=3.2 Mbit) for which the number of bits has not been reduced. Therefore, in the operation mode to capture a moving image, the amount of data when the solid-state imaging device 10 transmits (outputs) the pixel data to the image-processing unit 20 is 28.1 Mbit. As a result, it is possible to reduce the amount of data when the solid-state imaging device 10 transmits (outputs) the pixel data to the image-processing unit 20 more than in the operation mode to capture a still image.

Also in the operation mode to output a live view image shown in FIG. 7C, as in the operation mode to capture a moving image, the still image-processing unit 221 in the image-processing unit 20 does not perform image processing using the total pixel data D1. Accordingly, the solid-state imaging device 10 does not transmit (output) the total pixel data D1 to the imaging-processing unit 210 in the image-processing unit 20. Then, the solid-state imaging device 10 transmits (outputs) the 10-bit reduced pixel data D2 (the total number of output bits=27.6 Mbit) obtained by reducing the number of bits and the 14-bit reduced pixel data D3 (the total number of output bits=4.3 Mbit) for which the number of bits has not been reduced. Therefore, in the operation mode to output a live view image, the amount of data when the solid-state imaging device 10 transmits (outputs) the pixel data to the image-processing unit 20 is 31.9 Mbit. As a result, it is possible to reduce the amount of data when the solid-state imaging device 10 transmits (outputs) the pixel data to the image-processing unit 20 more than in the operation mode to capture a still image. The reason why the number of bits of the reduced pixel data D2 to be reduced in the operation mode to output a live view image is larger than the number of bits of the reduced pixel data D2 to be reduced in the operation mode to capture a moving image is that the operation mode to output a live view image is an operation mode in which higher priority is given to reducing the power consumption of the imaging system 1 than in the operation mode to capture a moving image.

In the operation mode to control AE, AF, AWB, and the like shown in FIG. 7D, the still image-processing unit 221 in the image-processing unit 20 does not perform image processing using the total pixel data D1, and the moving image-processing unit 222 and the display-processing unit 230 in the image-processing unit 20 do not perform image processing or display processing using the reduced pixel data D2. Therefore, the solid-state imaging device 10 does not transmit (output) the total pixel data D1 and the reduced pixel data D2 to the imaging-processing unit 210 in the image-processing unit 20. Then, the solid-state imaging device 10 transmits (outputs) only the 14-bit reduced pixel data D3 (the total number of output bits=4.3 Mbit) for which the number of bits has not been reduced. Therefore, in the operation mode to control AE, AF, AWB, and the like, the amount of data when the solid-state imaging device 10 transmits (outputs) the pixel data to the image-processing unit 20 is 4.3 Mbit. As a result, it is possible to reduce the amount of data when the solid-state imaging device 10 transmits (outputs) the pixel data to the image-processing unit 20 more than in the operation mode to capture a still image, the operation mode to capture a moving image, and the operation mode to output a live view image.

In the solid-state imaging device 10 according to the first embodiment, the transmission (output) of pixel data to the imaging-processing unit 210 in the image-processing unit 20, that is, transmission (output) to the external, is performed in a time-division manner by one transmission unit 140. However, the configuration of transmitting (outputting) the pixel data to the external is not limited only to the configuration shown in FIG. 2, and it is possible to transmit (output) the pixel data to the external similarly even with other configurations.

First Modification Example According to the First Embodiment

Here, the solid-state imaging device 10 having another configuration that transmits (outputs) pixel data to the external will be described. FIG. 8 is a block diagram showing the schematic configuration of a first modification example in the solid-state imaging device 10 according to the first embodiment. In the following explanation, the solid-state imaging device 10 of the first modification example according to the first embodiment is referred to as a "solid-state imaging device 11". The solid-state imaging device 11 shown in FIG. 8 is configured to include a pixel signal-processing unit 100, a first read unit 110, a second read unit 120, a third read unit 130, a first transmission unit 141, a second transmission unit 142, and a third transmission unit 143. The same components as those of the solid-state imaging device 10 are also included in the components of the solid-state imaging device 11 of the first modification example. Therefore, in the components of the solid-state imaging device 11 of the first modification example, the same reference numerals are given to the same components as those of the solid-state imaging device 10, and the detailed explanation thereof will be omitted.

The first read unit 110 performs analog-to-digital conversion of each total pixel signal S1 read from the pixel signal-processing unit 100. Then, the first read unit 110 outputs each digital value of the total pixel signal S1, which is obtained by reducing the number of bits after taking the difference, to the first transmission unit 141. The second read unit 120 performs analog-to-digital conversion of the reduced pixel signal S2 read from the pixel signal-processing unit 100. Then, the second read unit 120 outputs each digital value of the reduced pixel signal S2, which is obtained by reducing the number of bits after taking the difference, to the second transmission unit 142. The third read unit 130 performs analog-to-digital conversion of the reduced pixel signal S3 read from the pixel signal-processing unit 100. Then, the third read unit 130 outputs each digital value of the converted reduced pixel signal S3 to the third transmission unit 143.

The first transmission unit 141 transmits each digital value of the total pixel signal S1 output from the first read unit 110, as the total pixel data D1, to the external. The second transmission unit 142 transmits each digital value of the reduced pixel signal S2 output from the second read unit 120, as the reduced pixel data D2, to the external. The third transmission unit 143 transmits each digital value of the reduced pixel signal S3 output from the third read unit 130, as the reduced pixel data D3, to the external.

Through the configuration described above, the solid-state imaging device 11 also outputs each of the pieces of pixel data of three sizes to the imaging-processing unit 210 in the image-processing unit 20. That is, in the solid-state imaging device 11 of the first modification example, similar to the solid-state imaging device 10 according to the first embodiment, a plurality of digital values of the different numbers of pixels are transmitted (output) to the imaging-processing unit 210 in the image-processing unit 20 as pixel data by the configuration of the first transmission unit 141, the second transmission unit 142, and the third transmission unit 143. Therefore, in the image-processing unit 20 mounted in the imaging system 1 of the present embodiment, pixel data used in processing that requires a real-time performance and pixel data used in processing that requires the image quality can be properly used depending on each process.

Unlike the solid-state imaging device 10 according to the first embodiment, the solid-state imaging device 11 of the first modification example includes three transmission units of the first transmission unit 141, the second transmission unit 142, and the third transmission unit 143. Therefore, in the solid-state imaging device 11 of the first modification example, simultaneous output of pixel data of three sizes can be easily performed.

The order or the like when the first transmission unit 141, the second transmission unit 142, and the third transmission unit 143 transmits (outputs) the total pixel data D1, the reduced pixel data D2, and the reduced pixel data D3 to the imaging-processing unit 210 in the image-processing unit 20 as pixel data is not particularly defined. However, as described above, the reduced pixel data D2 can be output more quickly than the total pixel data D1, and the reduced pixel data D3 can be output more quickly than the reduced pixel data D2. For this reason, outputting the reduced pixel data D3 first, outputting the reduced pixel data D2 next, and outputting the total pixel data D1 last is advantageous when performing processing that requires a high real-time performance in the image-processing unit 20, such as the generation of a live view image, generation of the evaluation value by the evaluation value-generating unit 211, and recognition of the subject by the image recognition unit 250, for example.

In the solid-state imaging device 10 according to the first embodiment and the solid-state imaging device 11 of the first modification example, the first read unit 110 performs analog-to-digital conversion of each total pixel signal S1 read from the pixel signal-processing unit 100 and then takes a difference between the calculated digital value and the digital value of the reduced pixel signal S2. The second read unit 120 performs analog-to-digital conversion of the reduced pixel signal S2 read from the pixel signal-processing unit 100 and then takes a difference between the calculated digital value and the digital value of the reduced pixel signal S3. That is, each of the first read units 110 and 120 takes a difference between the digital value of the pixel signal read from the pixel signal-processing unit 100 and the digital value of the reduced pixel signal obtained by reducing the number of pixels provided in the pixel signal-processing unit 100 by one stage. However, the digital value of the reduced pixel signal used when taking the difference from the digital value of the pixel signal read by each of the first read units 110 and 120 is not limited to the digital value of the reduced pixel signal described above, and a configuration of taking the difference between the digital value of the pixel signal read by each of the first read units 110 and 120 and the digital value of another reduced pixel signal. For example, the first read unit 110 may be configured to take a difference between the digital value of the total pixel signal S1 read from the pixel signal-processing unit 100 and the digital value of the reduced pixel signal S3 obtained by reducing the number of pixels provided in the pixel signal-processing unit 100 by two stages.

Each of the first read units 110 and 120 is not limited to the configuration of taking the difference between the digital value of the read pixel signal and the digital value of the reduced pixel signal, and a configuration may be adopt in which it is possible to select whether to take the difference between the digital value of the read pixel signal and the digital value of the reduced pixel signal.

Second Modification Example According to the First Embodiment

Figure 9:
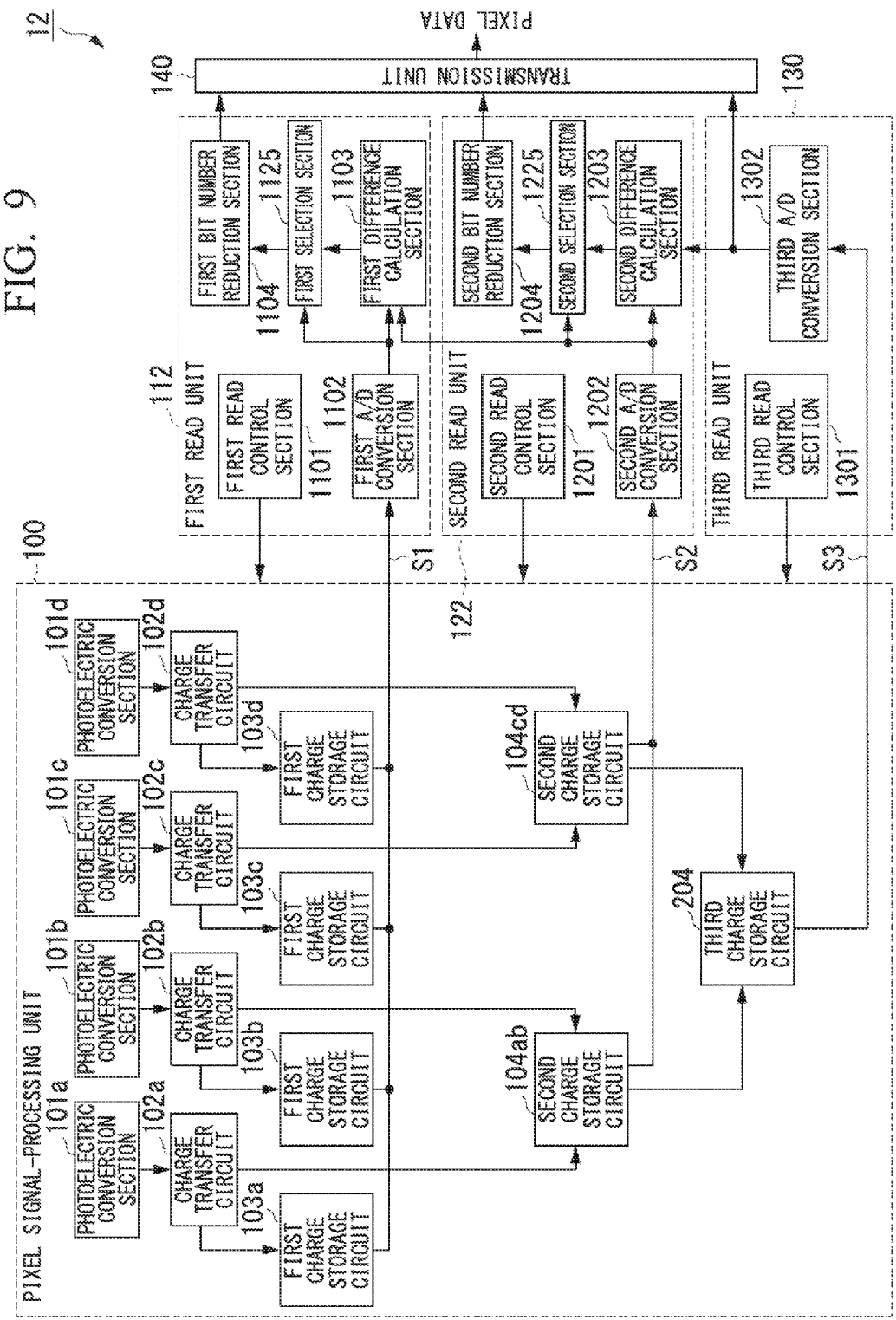
FIG. 9 is a block diagram showing the schematic configuration of a second modification example in the solid-state imaging device according to the first embodiment of the present invention.

Here, the solid-state imaging device 10 having a configuration in which it is possible to select whether to take the difference between the digital value of the read pixel signal and the digital value of the reduced pixel signal will be described. FIG. 9 is a block diagram showing the schematic configuration of a second modification example in the solid-state imaging device 10 according to the first embodiment. In the following explanation, the solid-state imaging device 10 of the second modification example according to the first embodiment is referred to as a "solid-state imaging device 12". The solid-state imaging device 12 shown in FIG. 9 is configured to include a pixel signal-processing unit 100, a first read unit 112, a second read unit 122, a third read unit 130, and a transmission unit 140. The same components as those of the solid-state imaging device 10 are also included in the components of the solid-state imaging device 12 of the second modification example. Therefore, in the components of the solid-state imaging device 12 of the second modification example, the same reference numerals are given to the same components as those of the solid-state imaging device 10, and the detailed explanation thereof will be omitted.

The pixel signal-processing unit 100 outputs each total pixel signal S1 to the first read unit 112 in response to the read control signal input from the first read unit 112. The pixel signal-processing unit 100 outputs each reduced pixel signal S2 to the second read unit 122 in response to the read control signal input from the second read unit 122. The pixel signal-processing unit 100 outputs each reduced pixel signal S3 to the third read unit 130 in response to the read control signal input from the third read unit 130.

The first read unit 112 operates similar to the first read unit 110 provided in the solid-state imaging device 10 and the solid-state imaging device 11 of the first modification example. That is, the first read unit 112 performs analog-to-digital conversion of each total pixel signal S1 read from the pixel signal-processing unit 100. Then, the first read unit 112 outputs the digital value of the total pixel signal S1, which is obtained by reducing the number of bits after taking a difference between the digital value of the total pixel signal S1 obtained by analog-to-digital conversion and the digital value of the reduced pixel signal S2 obtained by the analog-to-digital conversion of the second read unit 122, to the transmission unit 140. The first read unit 112 can also output the digital value of each total pixel signal S1, which is obtained by analog-to-digital conversion, to the transmission unit 140 by reducing the number of bits without taking the difference. The detailed explanation regarding the first read unit 112 will be given later.

The second read unit 122 operates similar to the second read unit 120 provided in the solid-state imaging device 10 and the solid-state imaging device 11 of the first modification example. That is, the second read unit 122 performs analog-to-digital conversion of the reduced pixel signal S2 read from the pixel signal-processing unit 100. Then, the second read unit 122 outputs each digital value of the reduced pixel signal S2, which is obtained by reducing the number of bits after taking a difference between each digital value of the reduced-pixel signal S2 obtained by analog-to-digital conversion and the digital value of the reduced pixel signal S3 obtained by the analog-to-digital conversion of the third read unit 130, to the transmission unit 140. The second read unit 122 can also output the digital value of each reduced pixel signal S2, which is obtained by analog-to-digital conversion, to the transmission unit 140 by reducing the number of bits without taking the difference. The detailed explanation regarding the second read unit 122 will be given later.

The transmission unit 140 transmits (outputs) each of the plurality of digital values of the different numbers of pixels, which are output from the first read unit 112, the second read unit 122, and the third read unit 130, to the external (imaging-processing unit 210 in the image-processing unit 20) as pixel data.

Through the configuration described above, in the solid-state imaging device 12, when outputting pixel data, it is possible to selectively output pixel data, which is obtained by performing processing for taking the difference between the digital value of the pixel signal read from the pixel signal-processing unit 100 and the digital value of the reduced pixel signal obtained by reducing the number of pixels provided in the pixel signal-processing unit 100 by one stage, or pixel data for which processing for taking the difference has not been performed.

Next, the configuration of the first read unit 112 provided in the solid-state imaging device 12 of the second modification example will be described in more detail. The first read unit 112 of the solid-state imaging device 12 according to the second embodiment shown in FIG. 9 is configured to include the first read control unit 1101, the first A/D conversion unit 1102, the first difference calculation unit 1103, the first bit number reduction unit 1104, and a first selection unit 1125. The same components as those of the first read unit 110 provided in the solid-state imaging device 10 and the solid-state imaging device 11 of the first modification example are also included in the components of the first read unit 112. Therefore, in the components of the first read unit 112, the same reference numerals are given to the same components as those of the first read unit 110, and the detailed explanation thereof will be omitted.

The first A/D conversion unit 1102 sequentially outputs each digital value, which is obtained by performing analog-to-digital conversion of the total pixel signal S1 (analog signal) read by the first read control unit 1101, to each of the first difference calculation unit 1103 and the first selection unit 1125. The first difference calculation unit 1103 sequentially outputs each digital value, which is obtained by taking the difference between the digital value of the total pixel signal S1 and the digital value of the reduced pixel signal S2, to the first selection unit 1125.

The first selection unit 1125 selects either the digital value of the total pixel signal S1 input sequentially from the first A/D conversion unit 1102 or the digital value obtained by taking the difference between the reduced pixel signal S2 and the total pixel signal S1 input sequentially from the first difference calculation unit 1103. Then, the first selection unit 1125 sequentially outputs the selected digital value to the first bit number reduction unit 1104.

The method of selecting the digital value in the first selection unit 1125 is not particularly defined. For example, the first selection unit 1125 may be configured to select a digital value according to the operation mode of the imaging system 1 set by the CPU 260 in the image-processing unit 20 provided in the imaging system 1 in which the solid-state imaging device 12 is mounted.

The first bit number reduction unit 1104 reduces the number of bits of the selected digital value, which is sequentially input from the first selection unit 1125, using a predetermined method, and outputs a digital value obtained by reducing the number of bits to the transmission unit 140 as each digital value of the total pixel signal S1 obtained by reducing the number of bits.

Through the configuration described above, the first read unit 112 reduces the number of bits of either each digital value, which is obtained by performing analog-to-digital conversion of the total pixel signal S1 read from the pixel signal-processing unit 100, or each digital value, which is obtained by taking the difference between the digital value obtained by performing analog-to-digital conversion of the total pixel signal S1 read from the pixel signal-processing unit 100 and the digital value of the reduced pixel signal S2 input from the second read unit 122, and outputs the result to the transmission unit 140. Then, the transmission unit 140 outputs each digital value with the reduced number of bits based on the total pixel signal S1 that is input from the first read unit 112, as the total pixel data D1 based on the total pixel signal S1 with the reduced number of bits, to the external.

Next, the configuration of the second read unit 122 provided in the solid-state imaging device 12 of the second modification example will be described in more detail. The second read unit 122 of the solid-state imaging device 12 of the second modification example shown in FIG. 9 is configured to include the second read control unit 1201, the second A/D conversion unit 1202, the second difference calculation unit 1203, the second bit number reduction unit 1204, and a second selection unit 1225. The same components as those of the second read unit 120 provided in the solid-state imaging device 10 and the solid-state imaging device 11 of the first modification example are also included in the components of the second read unit 122. Therefore, in the components of the second read unit 122, the same reference numerals are given to the same components as those of the second read unit 120, and the detailed explanation thereof will be omitted.

The second A/D conversion unit 1202 sequentially outputs each digital value, which is obtained by performing analog-to-digital conversion of the reduced pixel signal S2 (analog signal) read by the second read control unit 1201, to each of the second difference calculation unit 1203 and the second selection unit 1225. The second difference calculation unit 1203 sequentially outputs each digital value, which is obtained by taking the difference between the digital value of the reduced pixel signal S2 and the digital value of the reduced pixel signal S3, to the second selection unit 1225.

The second selection unit 1225 selects either the digital value of the reduced pixel signal S2 input sequentially from the second A/D conversion unit 1202 or the digital value obtained by taking the difference between the reduced pixel signal S2 and the reduced pixel signal S3 input sequentially from the second difference calculation unit 1203. Then, the second selection unit 1225 sequentially outputs the selected digital value to the second bit number reduction unit 1204.

The method of selecting the digital value in the second selection unit 1225 is not particularly defined. For example, the second selection unit 1225 may be configured to select a digital value according to the operation mode of the imaging system 1 in which the solid-state imaging device 12 is mounted, similar to the first selection unit 1125 provided in the first read unit 112.

The second bit number reduction unit 1204 reduces the number of bits of the selected digital value, which is sequentially input from the second selection unit 1225, using a predetermined method, and outputs a digital value obtained by reducing the number of bits to the transmission unit 140 as each digital value of the reduced pixel signal S2 obtained by reducing the number of bits.

Through the configuration described above, the second read unit 122 reduces the number of bits of either each digital value, which is obtained by performing analog-to-digital conversion of the reduced pixel signal S2 read from the pixel signal-processing unit 100, or each digital value, which is obtained by taking the difference between the digital value obtained by performing analog-to-digital conversion of the reduced pixel signal S2 read from the pixel signal-processing unit 100 and the digital value of the reduced pixel signal S3 input from the second read unit 122, and outputs the result to the transmission unit 140. Then, the transmission unit 140 outputs each digital value with the reduced number of bits based on the reduced pixel signal S2 that is input from the second read unit 122, as the reduced pixel data D2 based on the reduced pixel signal S2 with the reduced number of bits, to the external.

Through the configuration described above, the solid-state imaging device 12 also outputs each of the pieces of pixel data of three sizes to the imaging-processing unit 210 in the image-processing unit 20. The solid-state imaging device 12 operates to be different from the solid-state imaging device 10 and the solid-state imaging device 11 of the first modification example. That is, the solid-state imaging device 12 can select whether to perform processing for taking the difference between the digital value of the pixel signal read from the pixel signal-processing unit 100 and the digital value of the reduced pixel signal obtained by reducing the number of pixels provided in the pixel signal-processing unit 100 by one stage. The selection of whether to perform processing for taking the difference for the output pixel data is changed according to the operation mode of the imaging system 1 in which the solid-state imaging device 12 is mounted, for example. Then, the solid-state imaging device 12 outputs pixel data that has been subjected to the selected processing. Thus, in the image-processing unit 20 mounted in the imaging system 1 of the present embodiment, it is possible to omit the execution of processing for restoring the pixel data transmitted (output) from the solid-state imaging device 12 depending on the operation mode.

Here, the amount of data in the case of changing the pixel data transmitted between the solid-state imaging device 12 and the image-processing unit 20 according to the operation mode of the imaging system 1 in which the solid-state imaging device 12 is mounted will be described. FIGS. 10A to 10C are tables summarizing the relationship between the number of bits and the number of pixels of pixel data in the solid-state imaging device 12 of the second modification example according to the first embodiment. FIGS. 10A to 10C show the relationship between the number of pixels and the digital value in the case of transmitting (outputting) each digital value without taking the difference between the digital value of the reduced pixel signal S2 and the digital value of the reduced pixel signal S3 in a case where 5760 pixels by 4320 pixels are arranged in the horizontal and vertical directions of the pixel signal-processing unit 100 in the solid-state imaging device 12 and the digital values of the total pixel signal S1, the reduced pixel signal S2, and the reduced pixel signal S3 are transmitted (output) as pixel data. FIG. 10A shows an example of the relationship between the number of pixels and the digital value in a case where the operation mode of the imaging system 1 in which the solid-state imaging device 12 is mounted is an operation mode to capture a still image. FIG. 10B shows an example of the relationship between the number of pixels and the digital value in a case where the operation mode of the imaging system 1 in which the solid-state imaging device 12 is mounted is an operation mode to capture a moving image. FIG. 10C shows an example of the relationship between the number of pixels and the digital value in a case where the operation mode of the imaging system 1 in which the solid-state imaging device 12 is mounted is an operation mode to output a live view image. The following explanation will also be given with one bit of the digital value of one pixel as a piece of pixel data.

Also in the imaging system 1 in which the solid-state imaging device 12 is mounted, each component in the image-processing unit 20 performs processing based on preprocessed image data obtained by preprocessing the pixel data transmitted (output) from the solid-state imaging device 12 by the imaging-processing unit 210 in the image-processing unit 20. In the following explanation, however, for the simplicity of explanation, an example will be described in which the still image-processing unit 221 in the image-processing unit 20 performs image processing for recording a still image using the total pixel data D1 of the aspect ratio=4:3 based on the total pixel signal S1. An example will be described in which the moving image-processing unit 222 in the image-processing unit 20 performs image processing for recording a moving image using the reduced pixel data D2 of the aspect ratio=16:9 based on the reduced pixel signal S2. An example will be described in which the display-processing unit 230 in the image-processing unit 20 performs display processing for displaying a live view image on the display device 30 using the reduced pixel data D2 of the aspect ratio=4:3 based on the reduced pixel signal S2.

As shown in FIGS. 10A to 10C, the amount of pixel data transmitted between the solid-state imaging device 12 and the image-processing unit 20 can be reduced, even in the case of outputting the reduced pixel data D2 without taking the difference, by changing the pixel data output from the solid-state imaging device 12 according to the operation mode of the imaging system 1 in which the solid-state imaging device 12 is mounted.

In the operation mode to capture a still image shown in FIG. 10A, the solid-state imaging device 12 transmits (outputs) the 10-bit total pixel data D1 (the total number of output bits=248.8 Mbit) obtained by taking the difference and reducing the number of bits, the 13-bit reduced pixel data D2 (the total number of output bits=35.9 Mbit) obtained reducing the number of bits without taking the difference, and the 14-bit reduced pixel data D3 (the total number of output bits=4.3 Mbit) for which the number of bits has not been reduced. Therefore, in the operation mode to capture a still image, the amount of data when the solid-state imaging device 12 transmits (outputs) the pixel data to the image-processing unit 20 is 289.1 Mbit.

In contrast, in the operation mode to capture a moving image shown in FIG. 10B, the still image-processing unit 221 in the image-processing unit 20 does not perform image processing using the total pixel data D1 with the largest number of pixels. Therefore, the solid-state imaging device 12 transmits (outputs) the 12-bit reduced pixel data D2 (the total number of output bits=24.9 Mbit) obtained by reducing the number of bits without taking the difference and the 14-bit reduced pixel data D3 (the total number of output bits=3.2 Mbit), for which the number of bits has not been reduced, to the imaging-processing unit 210 in the image-processing unit 20. Thus, in the operation mode to capture a moving image, the amount of data when the solid-state imaging device 12 transmits (outputs) the pixel data to the image-processing unit 20 is 28.1 Mbit. As a result, it is possible to reduce the amount of data when the solid-state imaging device 12 transmits (outputs) the pixel data to the image-processing unit 20 more than in the operation mode to capture a still image. In the operation mode to capture a moving image shown in FIG. 10B, the 12-bit reduced pixel data D2 is transmitted (output) without taking the difference. For this reason, in the imaging system 1, processing for the restoration of the reduced pixel data D2 is not required. Therefore, it is possible to reduce the delay time when the moving image-processing unit 222 in the image-processing unit 20 generates moving image data of each frame.

Also in the operation mode to output a live view image shown in FIG. 10C, as in the operation mode to capture a moving image, the still image-processing unit 221 in the image-processing unit 20 does not perform image processing using the total pixel data D1. Therefore, the solid-state imaging device 12 transmits (outputs) the 10-bit reduced pixel data D2 (the total number of output bits=27.6 Mbit) obtained by reducing the number of bits without taking the difference and the 14-bit reduced pixel data D3 (the total number of output bits=4.3 Mbit), for which the number of bits has not been reduced, to the imaging-processing unit 210 in the image-processing unit 20. Therefore, in the operation mode to output a live view image, the amount of data when the solid-state imaging device 12 transmits (outputs) the pixel data to the image-processing unit 20 is 31.9 Mbit. As a result, it is possible to reduce the amount of data when the solid-state imaging device 12 transmits (outputs) the pixel data to the image-processing unit 20 more than in the operation mode to capture a still image. In the operation mode to output a live view image shown in FIG. 10C, the 10-bit reduced pixel data D2 is transmitted (output) without taking the difference. For this reason, in the imaging system 1, processing for the restoration of the reduced pixel data D2 is not required. Therefore, it is possible to reduce the delay time when the display-processing unit 230 in the image-processing unit 20 generates a live view image of each frame. The reason why the number of bits of the reduced pixel data D2 transmitted (output) in the operation mode to output a live view image is smaller than the number of bits of the reduced pixel data D2 transmitted (output) in the operation mode to capture a moving image is the same as the reason described in the relationship between the number of pixels and the number of bits shown in FIGS. 7A to 7D.

As shown in FIGS. 10A to 10C, by changing whether to transmit (output) pixel data and whether to take the difference between digital values according to the operation mode of the imaging system 1 in which the solid-state imaging device 12 is mounted, it is possible to perform processing using the pixel data of the number of pixels, which is suitable for the processing of each component provided in the image-processing unit 20, in the imaging system 1.

In the solid-state imaging device 12, the configuration of selecting whether to take the difference between the corresponding digital values using the first selection unit 1125 provided in the first read unit 112 and the second selection unit 1225 provided in the second read unit 122 has been described. However, for example, in the second read unit 122, in a case where it is known in advance that the processing for taking the difference between the digital value of the reduced pixel signal S2 and the digital value of the reduced pixel signal S3 is not required, the second read unit 122 may also be configured not to include the second difference calculation unit 1203.

According to the first embodiment, a solid-state imaging device (solid-state imaging device 10) is configured that includes: a pixel signal-processing unit (pixel signal-processing unit 100) that includes a plurality of pixels arranged in a two-dimensional matrix and that outputs each of pixel signals, which are generated by all of the pixels arranged herein, as an total pixel signal (total pixel signal S1) and outputs each of the pixel signals generated by the pixels as a reduced pixel signal (reduced pixel signal S2), which is obtained by reducing each of the pixel signals generated by the pixels to a predetermined number of pixels; a difference calculation unit (first difference calculation unit 1103) that outputs a digital value obtained by calculating a difference between a digital value indicating the magnitude of the total pixel signal S1 and a digital value indicating the magnitude of the reduced pixel signal S2; and a bit number reduction unit (first bit number reduction unit 1104) that reduces the number of bits of either the digital value, which is obtained by difference calculation of the first difference calculation unit 1103, or the digital value indicating the magnitude of the total pixel signal S1 and outputs a digital value with the reduced number of bits as a digital value (total pixel data D1) corresponding to the total pixel signal S1 and that outputs the digital value (total pixel data D1) corresponding to the total pixel signal S1 and the digital value (reduced pixel data D2) indicating the magnitude of the reduced pixel signal S2.

According to the first embodiment, the solid-state imaging device 10 is configured in which the reduced pixel signal S2 is a pixel signal obtained by averaging the pixel signals generated in the same exposure period by the plurality of corresponding pixels.

According to the first embodiment, the solid-state imaging device 10 is configured in which the reduced pixel signal S2 is a pixel signal, which is generated by one of the pixels determined in advance, of the pixel signals generated in the same exposure period by the plurality of corresponding pixels.

According to the first embodiment, an imaging system (imaging system 1) is configured that includes a solid-state imaging device (solid-state imaging device 10) and restores the digital value (total pixel data D1) corresponding to the total pixel signal S1 to the digital value indicating the magnitude of the total pixel signal S1 based on the digital value (reduced pixel data D2) indicating the magnitude of the reduced pixel signal S2 output from the solid-state imaging device 10.

According to the first embodiment, the imaging system 1 is configured that restores a digital value indicating the magnitude of the total pixel signal S1 by adding the digital value (reduced pixel data D2) indicating the magnitude of the reduced pixel signal S2 to the digital value (total pixel data D1) corresponding to the total pixel signal S1.

As described above, in the solid-state imaging device 10 according to the first embodiment (including the solid-state imaging device 11 of the first modification example and the solid-state imaging device 12 of the second modification example), it is possible to output the pixel data of the various numbers of pixels while suppressing an increase in the amount of data by reducing the number of bits of pixel data with a large number of pixels. Therefore, in the imaging system 1 of the present embodiment in which the solid-state imaging device 10 according to the first embodiment is mounted, it is possible to perform the processing using the pixel data of the number of pixels suitable for the processing of each component provided in the image-processing unit 20.

In the solid-state imaging device 10 according to the first embodiment, the respective pieces of pixel data are sequentially transmitted (output) to the external (imaging-processing unit 210 in the image-processing unit 20) in a time-division manner for each frame. In the solid-state imaging device 10 according to the first embodiment, pixel data that is not processed by the component of the imaging-processing unit 210 in the image-processing unit 20 is not transmitted (output) depending on the operation mode of the imaging system 1 in which the solid-state imaging device 10 is mounted. However, as described above, in the solid-state imaging device 10, the order or the like when transmitting (outputting) each piece of pixel data to the imaging-processing unit 210 in the image-processing unit 20 is not particularly defined. Therefore, in this solid-state imaging device 10, it is also possible to change the order of transmitting (outputting) the pixel data.

Second Embodiment

Next, a solid-state imaging device of a second embodiment mounted in the imaging system 1 of the present embodiment will be described. The solid-state imaging device according to the second embodiment has the same configuration as the solid-state imaging device 10 according to the first embodiment (including the solid-state imaging device 11 of the first modification example and the solid-state imaging device 12 of the second modification example), and only the output sequences of pixel data are different. In the following explanation, detailed explanation regarding the configuration of the solid-state imaging device according to the second embodiment will be omitted since the solid-state imaging device according to the second embodiment has the same configuration as the solid-state imaging device 12 of the second modification example according to the first embodiment, and the output sequence of pixel data that is different from the solid-state imaging device 12 of the second modification example according to the first embodiment (including the solid-state imaging device 10 and the solid-state imaging device 11 of the first modification example) will be described.

FIG. 11 is a diagram showing the output sequence of pixel data in the solid-state imaging device 12 according to the second embodiment. In the solid-state imaging device 12 according to the second embodiment, similar to the solid-state imaging device 12 according to the first embodiment, the reduced pixel data D3, the reduced pixel data D2, and the total pixel data D1 are transmitted (output) in a time-division manner. In the solid-state imaging device 12 according to the second embodiment, however, as in the output sequence of the pixel data shown in FIG. 11, when transmitting (outputting) the total pixel data D1 of one frame after transmitting (outputting) the reduced pixel data D2 of one frame, the total pixel data D1 is divided, and the reduced pixel data D2 is divided and is transmitted (output) again during the period.

In the imaging system 1 in which the solid-state imaging device 12 according to the second embodiment of the present invention is mounted, the transmission (output) of the first reduced pixel data D2 is transmission (output) for generating a live view image by the display-processing unit 230 in the image-processing unit 20. In the imaging system 1 in which the solid-state imaging device 12 according to the second embodiment is mounted, the transmission (output) of the subsequent divided reduced pixel data D2 is transmission (output) for restoring the total pixel data D1 that is used when the still image-processing unit 221 in the image-processing unit 20 generates a still image. Therefore, it is preferable that the reduced pixel data D2, which is transmitted (output) again by the solid-state imaging device 12 according to the second embodiment, be the reduced pixel data D2 for which no difference has been taken. For this reason, in the following explanation, an example will be described in which the second selection unit 1225 provided in the second read unit 122 in the solid-state imaging device 12 according to the second embodiment selects the digital value of the reduced pixel signal S2 for which no difference has been taken, that is, the digital value of the reduced pixel signal S2 input from the second A/D conversion unit 1202.

More specifically, when the solid-state imaging device 12 according to the second embodiment outputs pixel data, first, the third read unit 130 outputs the digital value of the reduced pixel signal S3 of one frame, which is obtained by sequentially reading each reduced pixel signal S3 of one frame and performing analog-to-digital conversion, to the transmission unit 140 as it is, similar to the solid-state imaging device 12 according to the first embodiment. Then, the transmission unit 140 sequentially transmits (outputs) the reduced pixel data D3 of one frame to the external.

Then, similar to the solid-state imaging device 12 according to the first embodiment, the second read unit 120 sequentially outputs the digital value of the reduced pixel signal S2, which is obtained by sequentially reading the reduced pixel signal S2 corresponding to the digital value of the reduced pixel signal S3 output from the third read unit 130, performs analog-to-digital conversion, takes the difference, and then reduces the number of bits, to the transmission unit 140. Then, the transmission unit 140 sequentially transmits (outputs) the reduced pixel data D2 of one frame to the external. Here, the display-processing unit 230 in the image-processing unit 20 generates a live view image using the reduced pixel data D2 of one frame that has been transmitted (output).

Then, in the solid-state imaging device 12 according to the second embodiment, the first read control unit 1101 in the first read unit 110 outputs a read control signal, which is for sequentially reading the total pixel signal S1, to the first charge storage circuits 103a to 103d in the pixel signal-processing unit 100. Thus, the total pixel signal S1 is sequentially output from the first charge storage circuits 103a to 103d, and is sequentially input to the first A/D conversion unit 1102. Then, the first A/D conversion unit 1102 sequentially outputs the digital value of the total pixel signal S1, which is obtained by performing analog-to-digital conversion of the total pixel signal S1 that is sequentially input, to the first difference calculation unit 1103.

The second read control unit 1201 in the second read unit 120 sequentially outputs a read control signal, which is for sequentially reading the reduced pixel signal S2 corresponding to the total pixel signal S1 read by the first read unit 110, to each of the second charge storage circuits 104ab and 104cd in the pixel signal-processing unit 100. Here, the reduced pixel signal S2 that the second read control unit 1201 reads from each of the second charge storage circuits 104ab and 104cd in the pixel signal-processing unit 100 is the reduced pixel signal S2 that is used to restore the total pixel signal S1 read by the first read unit 110. For example, in a case where the first read unit 110 reads the total pixel signal S1 of five rows arranged in the pixel signal-processing unit 100, the second read control unit 1201 reads the reduced pixel signal S2 of rows that is used to restore the total pixel signal S1 of five rows. Accordingly, the reduced pixel signal S2 corresponding to the total pixel signal S1 read by the first read unit 110 is sequentially output from each of the second charge storage circuits 104ab and 104cd, and is sequentially input to the second A/D conversion unit 1202. Then, the second A/D conversion unit 1202 sequentially outputs the digital value of the reduced pixel signal S2, which is obtained by performing analog-to-digital conversion of the reduced pixel signal S2 that is sequentially input, to the second selection unit 1225 and the first difference calculation unit 1103 in the first read unit 110.

Then, the first difference calculation unit 1103 sequentially outputs each digital value, which is obtained by taking the difference between the digital value of the total pixel signal S1 sequentially input from the first A/D conversion unit 1102 and the digital value of the reduced pixel signal S2 sequentially input from the second A/D conversion unit 1202 in the second read unit 120, to the first bit number reduction unit 1104 through the first selection unit 1125. Then, the first bit number reduction unit 1104 reduces the number of bits of the digital value of the total pixel signal S1, which is sequentially input from the first difference calculation unit 1103 through the first selection unit 1125 and for which a difference has been taken, using a predetermined method, and sequentially outputs the result to the transmission unit 140.

The second selection unit 1225 sequentially outputs the digital value of the reduced pixel signal S2, which is sequentially input from the second A/D conversion unit 1202, to the second bit number reduction unit 1204. Then, the second bit number reduction unit 1204 reduces the number of bits of the digital value of the reduced pixel signal S2, which is sequentially input from the second selection unit 1225 and for which no difference has been taken, using a predetermined method, and sequentially outputs the result to the transmission unit 140.

Then, the transmission unit 140 sequentially transmits (outputs) a set of reduced pixel data D2, which is based on the reduced pixel signal S2 input from the second read unit 120, and total pixel data D1, which is based on the total pixel signal S1 input from the first read unit 110, to the external. For example, in a case where the first read unit 110 reads the total pixel signal S1 of five rows arranged in the pixel signal-processing unit 100, the transmission unit 140 sequentially transmits (outputs) a set of reduced pixel data D2 based on the reduced pixel signal S2 of rows used to restore the total pixel signal S11 of five rows and total pixel data D1 based on the total pixel signal S1 of five rows, which are input from the second read unit 120, to the external.

Thereafter, the first read unit 110 and the second read unit 120 repeat the transmission (output) based on the set of total pixel data D1 and reduced pixel data D2 until the transmission (output) of the total pixel data D1 of one frame is completed. In each set of total pixel data D1 and reduced pixel data D2, the reduced pixel data D2 is transmitted (output) first.

Thus, in the solid-state imaging device 12 according to the second embodiment, pixel data is transmitted (output) in a time-division manner. In the solid-state imaging device 12 according to the second embodiment, when transmitting (outputting) pixel data to be restored for which a difference has been taken, a set of pixel data to be restored and pixel data with the reduced number of pixels, which corresponds to the divided pixel data obtained by dividing the pixel data to be restored and for which no difference has been taken, are alternately transmitted (output). That is, pixel data to be restored and pixel data to be used in the restoration of the pixel data are transmitted (output) together with each other.

Therefore, in the imaging system 1 in which the solid-state imaging device 12 according to the second embodiment is mounted, the image-processing unit 20 can easily perform processing for restoring the pixel data output from the solid-state imaging device 12. This is because it is possible to perform the processing for restoring the pixel data in synchronization with the timing at which the pixel data to be restored has been transmitted (output). Therefore, when restoring the pixel data, it is not necessary to temporarily store a large amount of pixel data, which is to be used in the restoration of the pixel data, in the storage unit in the imaging system 1.

More specifically, in the imaging system 1 that operates such that the transmission (output) of all pieces of the reduced pixel data D2 to be used in the restoration of the total pixel data D1 is completed before transmitting (outputting) the total pixel data D1 to be restored, for example, it is necessary to temporarily store all pieces of the reduced pixel data D2 in the DRAM 40 and read the corresponding reduced pixel data D2 from the DRAM 40 when the total pixel data D1 to be restored has been transmitted (output) so that the corresponding reduced pixel data D2 can be used in the processing for restoring the total pixel data D1. Storing all pieces of the reduced pixel data D2 in the DRAM 40 and reading the corresponding reduced pixel data D2 from the DRAM 40, that is, accessing a large amount of reduced pixel data D2 through the data bus 290 in the imaging system 1, can be a factor that puts pressure on the bus region of the data bus 290. In contrast, in a case where the total pixel data D1 and the reduced pixel data D2, which is used in the restoration of the pixel data D1, are transmitted (output) as a set, it is possible to sequentially perform the processing for restoring the total pixel data D1 by temporarily storing only a small amount of reduced pixel data D2 to be used in the restoration of the total pixel data D1. For example, just by providing a line buffer, which temporarily stores a small amount of reduced pixel data D2 to be used in the restoration, in the imaging-processing unit 210, it is possible to realize a configuration capable of sequentially performing processing for restoring the total pixel data D1. In this manner, it is possible to avoid the pressure on the bus region of the data bus 290 in the imaging system 1.

Figure 12:
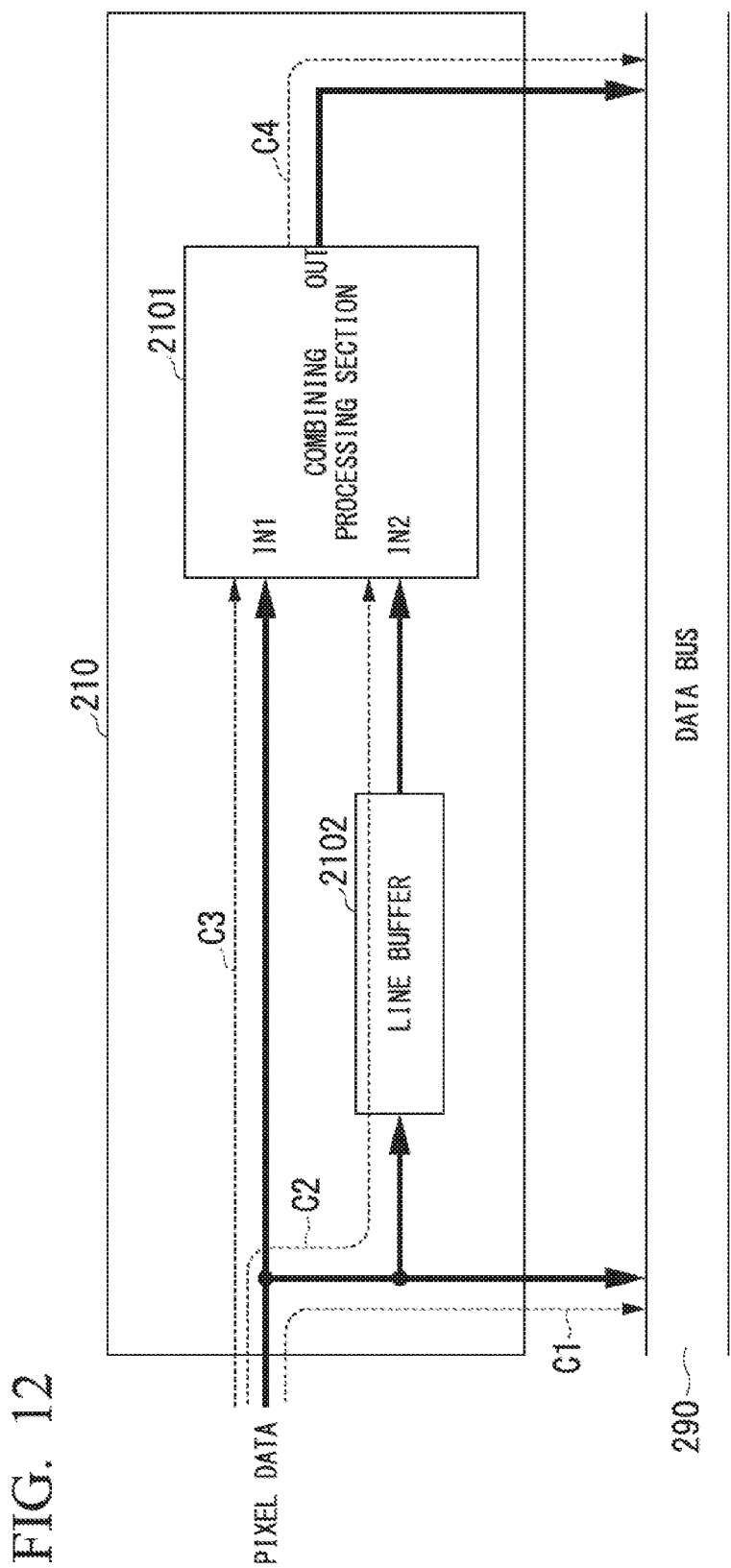
FIG. 12 is a diagram showing an example of a method of restoring pixel data output from the solid-state imaging device according to the second embodiment of the present invention in a simplified manner.

Here, an example of the restoration method in which the image-processing unit 20 restores the pixel data output from the solid-state imaging device 12 according to the second embodiment will be described. FIG. 12 is a diagram showing an example of the method of restoring the pixel data output from the solid-state imaging device 12 according to the second embodiment in a simplified manner. The schematic configuration of the imaging-processing unit 210 provided in the image-processing unit 20, which restores the pixel data output from the solid-state imaging device 12 according to the second embodiment, and an example of the path of pixel data when restoring the pixel data are shown in FIG. 12 in a simplified manner. The imaging-processing unit 210 shown in FIG. 12 includes a combining processing unit 2101 and a line buffer 2102. Although the imaging-processing unit 210 includes components, such as a preprocessing unit that performs preprocessing on the input pixel data, these are omitted in FIG. 12. The following explanation will be given on the assumption that the total pixel data D1 is restored using the corresponding reduced pixel data D2.

The combining processing unit 2101 is a processing unit that performs processing for restoring a digital value by combining the input digital values. More specifically, the number of bits of the total pixel data D1 input to an input terminal IN1 is restored, and the reduced pixel data D2 input to an input terminal IN2 is added to the digital value obtained by restoring the number of bits. As a result, the total pixel signal S1 corresponding to the total pixel data D1 input to the input terminal IN1 is restored. Then, the combining processing unit 2101 outputs the digital value of the restored total pixel signal S1 from an output terminal OUT. The combining processing in the combining processing unit 2101 is the same processing as the processing for restoring the digital value of the total pixel signal S1 by restoring the total pixel data D1 as shown in FIG. 4B.

The line buffer 2102 is a temporary storage unit that stores pixel data with the reduced number of pixels, which corresponds to pixel data to be restored and for which no difference has been taken, as many as rows to be used in the restoration of pixel data. For example, the line buffer 2102 is a memory, such as a static random access memory (SRAM).

Through the configuration described above, the imaging-processing unit 210 can sequentially perform processing for restoring the total pixel data D1 using the reduced pixel data D2 transmitted (output) as a set from the solid-state imaging device 12.

Here, in the configuration of the imaging-processing unit 210 shown in FIG. 12, an operation in a case where the pixel data is transmitted (output) in the output sequence shown in FIG. 11 will be described. First, when the reduced pixel data D3 of one frame is transmitted (output) from the solid-state imaging device 12, the imaging-processing unit 210 outputs the transmitted reduced pixel data D3 of one frame to the data bus 290 through a path C1 to transmit (write) the transmitted reduced pixel data D3 of one frame, for example, to the DRAM 40.

Then, when the reduced pixel data D2 of one frame is transmitted (output) from the solid-state imaging device 12, the imaging-processing unit 210 outputs the transmitted reduced pixel data D2 of one frame to the data bus 290 through the path C1 again to transmit (write) the transmitted reduced pixel data D2 of one frame, for example, to the DRAM 40. Thus, the display-processing unit 230 in the image-processing unit 20 can generate a live view image based on the reduced pixel data D2 recorded in the DRAM 40, and output the live view image to the display device 30 so that the live view image is displayed thereon.

Then, when the first set of total pixel data D1 and reduced pixel data D2 are transmitted (output) from the solid-state imaging device 12, the imaging-processing unit 210 outputs the transmitted reduced pixel data D2 to the line buffer 2102 through a path C2 so that the transmitted reduced pixel data D2 is stored in the line buffer 2102. Then, the line buffer 2102 sequentially outputs the stored reduced pixel data D2 to the input terminal IN2 of the combining processing unit 2101. The imaging-processing unit 210 outputs the transmitted total pixel data D1 to the combining processing unit 2101 through a path C3. Then, the combining processing unit 2101 restores the total pixel signal S1 corresponding to the total pixel data D1 based on the total pixel data D1 input to the input terminal IN1 and the reduced pixel data D2 input to the input terminal IN2. Then, the combining processing unit 2101 outputs the digital value of the restored total pixel signal S1 from the output terminal OUT, outputs the digital value to the data bus 290 through a path C4, and transmits (writes) the digital value to the DRAM 40, for example.

Thereafter, the imaging-processing unit 210 outputs each set of pixel data of the total pixel data D1 and the reduced pixel data D2, which have been transmitted (output) sequentially from the solid-state imaging device 12, to the line buffer 2102 and the combining processing unit 2101 to restore the total pixel signal S1 corresponding to the total pixel data D1 of one frame.

Through the operation described above, the imaging-processing unit 210 can sequentially perform processing for restoring the total pixel data D1 using the reduced pixel data D2 that has been divided into a plurality of pieces of pixel data by the solid-state imaging device 12 and has been transmitted (output) together with each other.

In the output sequence in the solid-state imaging device 12 according to the second embodiment shown in FIG. 11, the reduced pixel data D2 of one frame is transmitted (output), and then the reduced pixel data D2 of one frame is transmitted (output) again after being divided. As described above, this is because the first reduced pixel data D2 of one frame is used in the generation of a live view image by the display-processing unit 230 in the image-processing unit 20 and the reduced pixel data D2, which is output again after being divided, is used in the generation of a still image by the still image-processing unit 221 in the image-processing unit 20. That is, this is because a live view image is generated in real time by transmitting (outputting) the reduced pixel data D2 of one frame first and the total pixel data D1 is sequentially restored using the reduced pixel data D2 that has been transmitted (output) again. However, in a case where a high real-time performance is not required when performing processing using the reduced pixel data D2, for example, in a case where a live view image is not generated in real time, the first reduced pixel data D2 of one frame may not be transmitted (output). In this manner, it is possible to reduce the amount of pixel data transmitted between the solid-state imaging device 12 and the image-processing unit 20.

The output sequence of pixel data in the solid-state imaging device 12 in this case will be described. FIG. 13 is a diagram showing another output sequence of pixel data in the solid-state imaging device 12 according to the second embodiment. In the output sequence of pixel data shown in FIG. 13, the solid-state imaging device 12 transmits (outputs) the reduced pixel data D3 of one frame, then divides the reduced pixel data D2 of one frame and the total pixel data D1 of one frame, and transmits (outputs) the divided reduced pixel data D2 and the divided total pixel data D1 together with each other.

The reason why the reduced pixel data D3 of one frame is transmitted (output) first is that the evaluation value generation processing of the evaluation value-generating unit 211 in the image-processing unit 20 or processing for subject recognition in the image recognition unit 250 is performed in real time in the imaging system 1 in which the solid-state imaging device 12 according to the second embodiment is mounted. The operation of each component in the solid-state imaging device 12 based on the output sequence of pixel data shown in FIG. 13 is the same as the operation of each component in the solid-state imaging device 12 based on the output sequence of pixel data shown in FIG. 11 except that the reduced pixel data D2 of one frame is not sequentially transmitted (output) to the external. Accordingly, detailed explanation of the operation of each component in the solid-state imaging device 12 based on the output sequence of pixel data shown in FIG. 13 will be omitted.

Thus, in the solid-state imaging device 12 according to the second embodiment, when transmitting (outputting) pixel data to be restored for which a difference has been taken, a set of pixel data to be restored and pixel data, which corresponds to the divided pixel data and for which no difference has been taken, are transmitted (output) alternately (together with each other). Accordingly, it is possible to reduce the amount of pixel data transmitted between the solid-state imaging device 12 and the image-processing unit 20.

In the output sequence of pixel data in the solid-state imaging device 12 shown in FIGS. 11 and 13, a case has been described in which the second read unit 120 reads the reduced pixel signal S2 corresponding to the total pixel data D1 based on the total pixel signal S1 transmitted (output) after being divided, which has been read by the first read unit 110, and sequentially transmits (outputs) the reduced pixel data D2 based on the reduced pixel signal S2 to the external. That is, the second read unit 120 reads the corresponding reduced pixel signal S2 with the total pixel data D1 as a reference. However, the reduced pixel signal S2 is a pixel signal obtained by reducing the number of pixels of the total pixel signal S1. That is, the reduced pixel signal S2 corresponds to a pixel signal of a predetermined number of pixels included in the total pixel signal S1. Accordingly, when transmitting (outputting) a set of total pixel data D1 and reduced pixel data D2 in the solid-state imaging device 12, the first read unit 110 can read the total pixel signal S1 with the number of pixels included in the reduced pixel signal S2 corresponding to the reduced pixel data D2. That is, the first read unit 110 may read the corresponding total pixel signal S1 with the reduced pixel data D2 as a reference, and a set of total pixel data D1 based on the read total pixel signal S1 and reduced pixel data D2 as a reference may be transmitted (output). In other words, the number of rows or the number of pixels, for which the first read unit 110 reads the total pixel signal S1, may be determined based on the reduced pixel data D2.

In the output sequence of pixel data in the solid-state imaging device 12 shown in FIGS. 11 and 13, an output sequence of transmitting (outputting) a set of total pixel data D1 and reduced pixel data D2 is shown. This is because the reduced pixel data D2 is pixel data based on the reduced pixel signal S2 for which no difference has been taken. However, in a case where the reduced pixel data D2 is pixel data based on the reduced pixel signal S2 for which a difference has been taken, an output sequence is applied in which, when transmitting (outputting) a set of total pixel data D1 for which a difference has been taken and reduced pixel data D2, the reduced pixel data D3 based on the reduced pixel signal S3 for which no difference has been taken is also transmitted (output) so as to be included in the set. In this manner, it is possible to restore the total pixel signal S1 corresponding to the total pixel data D1 and the reduced pixel signal S2 corresponding to the reduced pixel data D2 through the same processing. According to the output sequence, also in the solid-state imaging device 10 shown in FIG. 2 or the solid-state imaging device 11 shown in FIG. 8 that is not configured such that pixel data based on the reduced pixel signal S2 for which no difference has been taken is output as the reduced pixel data D2, it is possible to easily perform the above processing using this configuration as it is.

In a case where the solid-state imaging device 12 transmits (outputs) the total pixel data D1 and the reduced pixel data D2, for which a difference has been taken, and the reduced pixel data D3, for which no difference has been taken, as a set, a configuration can be considered in which the imaging-processing unit 210 further includes the same components as the combining processing unit 2101 and the line buffer 2102 shown in FIG. 12 in order to restore the reduced pixel signal S2 corresponding to the reduced pixel data D2. Then, in the configuration of the imaging-processing unit 210, an operation can be considered in which the reduced pixel data D3 for which no difference has been taken is temporarily stored in the line buffer, which is newly provided in order to restore the reduced pixel signal S2, and then the newly provided combining processing unit outputs the restored reduced pixel signal S2 to the line buffer 2102 to store the restored reduced pixel signal S2 in the line buffer 2102. Thus, the combining processing unit 2101 can restore the total pixel signal S1 corresponding to the total pixel data D1 as described above using the reduced pixel signal S2 stored in the line buffer 2102.

According to the second embodiment, a solid-state imaging device (solid-state imaging device 12) is configured such that the first bit number reduction unit 1104 reduces the number of bits of the digital value obtained by the difference calculation of the first difference calculation unit 1103, outputs the digital value with the number of bits reduced herein, which is obtained by the difference calculation, as a digital value corresponding to the total pixel signal S1 (total pixel data D1), divides the digital value corresponding to the total pixel signal S1 (total pixel data D1) for each digital value corresponding to the predetermined number of pixels, and sequentially outputs a digital value obtained by division herein and a digital value (reduced pixel data D2), which indicates the magnitude of the reduced pixel signal S2 corresponding to a predetermined number of pixels included in the digital value obtained by division, as a set.

According to the second embodiment, the solid-state imaging device 12 is configured such that a digital value (reduced pixel data D2) indicating the magnitude of the reduced pixel signal S2 corresponding to the digital value obtained by division is output first in each set of the digital value corresponding to the divided total pixel signal S1 (total pixel data D1) and the digital value (reduced pixel data D2) indicating the magnitude of the reduced pixel signal S2 corresponding to the digital value obtained by division.

As described above, also in the solid-state imaging device 12 according to the second embodiment (including the solid-state imaging device 10 and the solid-state imaging device 11 of the first modification example), it is possible to output the pixel data of the various numbers of pixels while suppressing an increase in the amount of data by reducing the number of bits of pixel data with a large number of pixels, similar to the solid-state imaging device 10 according to the first embodiment (including the solid-state imaging device 11 of the first modification example and the solid-state imaging device 12 of the second modification example). Therefore, also in the imaging system 1 of the present embodiment in which the solid-state imaging device 12 according to the second embodiment is mounted, it is possible to perform the processing using the pixel data of the number of pixels suitable for the processing of each component provided in the image-processing unit 20.

In the solid-state imaging device 12 according to the second embodiment, pixel data to be restored and pixel data used in the restoration of the pixel data are transmitted (output) together with each other. Therefore, in the imaging system 1 of the present embodiment in which the solid-state imaging device 12 according to the second embodiment is mounted, it is possible to reduce the amount of pixel data transmitted between the solid-state imaging device 12 and the image-processing unit 20. Since the processing performed by the image-processing unit 20 in order to restore the pixel data can be performed in synchronization with the timing, at which the pixel data has been transmitted (output) from the solid-state imaging device 12, with a small circuit scale, it is possible to suppress the pressure on the bus region of the data bus 290 in the imaging system 1.

As described above, according to each of the above embodiments for carrying out the present invention, the pixel signal corresponding to the signal charges of all pixels provided in the pixel signal-processing unit, which are obtained by the same exposure, and the pixel signal obtained by reducing the number of the pixels provided in the pixel signal-processing unit are output separately and independently. According to each of the embodiments described above, when outputting pixel data based on each pixel signal the number of bits of pixel data with a large number of pixels is reduced. Therefore, in each of the embodiments described above, it is possible to output the pieces of pixel data with the various numbers of pixels (sizes) while suppressing an increase in the amount of data to be output. For this reason, in the imaging system in which the solid-state imaging device of each of the embodiments described above is mounted, even if the size conversion of pixel data output from the solid-state imaging device, which has been performed in the imaging system in which a conventional solid-state imaging device is mounted, is not performed, it is possible to perform processing with pixel data of the size suitable for each process. Thus, in the imaging system in which the solid-state imaging device of each of the embodiments described above is mounted, it is possible to shorten the total processing time since the size conversion processing is not necessary. That is, it is possible to improve the processing speed of the imaging system.

According to each of the embodiments described above, it is possible to output the pixel data of the various numbers of pixels at the same time. Therefore, each component that performs processing according to various operation modes in the imaging system in which the solid-state imaging device of each of the embodiments described above is mounted can perform the processing using the pixel data with the number of pixels suitable for each process performed in each operation mode.

In the present embodiment, a configuration is shown in which the pixel signal-processing unit 100 provided in the solid-state imaging device of each of the embodiments and the modification examples includes the second charge storage circuit 104, which stores the signal charge obtained by averaging the amount of signal charges generated by the corresponding photoelectric conversion unit 101 provided in each pixel, and the third charge storage circuit 204, which stores the signal charge obtained by further averaging the amount of signal charges stored in the second charge storage circuit 104 stored. However, the configuration of the pixel signal-processing unit provided in the solid-state imaging device of the present invention is not limited to the configuration shown in the pixel signal-processing unit 100 provided in the solid-state imaging device of each of the embodiments and the modification examples. For example, it is also possible to adopt a configuration of further averaging the averaged signal charge stored in the third charge storage circuit 204.

In the present embodiment, an example of the configuration is shown in which two predetermined pixels are a set in the pixel signal-processing unit 100 provided in the solid-state imaging device of each of the embodiments and the modification examples. However, the set of pixels in the pixel signal-processing unit provided in the solid-state imaging device of the present invention is not limited to the configuration of the embodiment for carrying out the present invention. That is, it is also possible to configure one set with a larger number of pixels than in the configuration shown in the embodiment for carrying out the present invention.

The number of pixels provided in the pixel signal-processing unit 100 or the number to reduce the number of pixels is not limited to the embodiment for carrying out the present invention, and the number of pixels provided in the pixel signal-processing unit 100 or the number to reduce the number of pixels can be changed in the range without departing from the spirit of the present invention.

In the present embodiment, there is no limitation on the solid-state imaging device of each of the embodiments and the modification examples or the structure for arranging the respective components provided in each solid-state imaging device. For example, a multilayer substrate structure may be adopted in which the respective components provided in each solid-state imaging device are arranged on a plurality of substrates, or a so-called monolithic structure may be adopted in which the respective components provided in each solid-state imaging device are arranged on one substrate.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A solid-state imaging device, comprising:
a pixel signal-processing unit which includes a plurality of pixels arranged in a two-dimensional matrix, wherein the pixel signal-processing unit outputs each of pixel signals generated by each of all of the arranged pixels as a total pixel signal, while output each of the pixel signals generated by the plurality of pixels with the number of pixels reduced to a predetermined number of pixels as a reduced pixel signal;
a read unit circuit which outputs a digital value obtained by calculating a difference between a digital value indicating a magnitude of the total pixel signal and a digital value indicating a magnitude of the reduced pixel signal, the read unit circuit reducing the number of bits of the calculated digital value of the difference by reducing lower bits, and the read unit circuit outputting a digital value whose number of bits is reduced as a digital value corresponding to the total pixel signal,
wherein the solid-state imaging device outputs the digital value corresponding to the total pixel signal and the digital value indicating the magnitude of the reduced pixel signal,
wherein the reduced pixel signal is obtained by averaging the pixel signals generated in the same exposure period by the plurality of corresponding pixels,
wherein the read unit circuit reduces the number of bits of the digital value of the difference, and outputs the digital value of the difference with the reduced number of bits as a digital value corresponding to the total pixel signal, and
wherein the solid-state imaging device divides the digital value corresponding to the total pixel signal for each digital value corresponding to a predetermined number of pixels, and sequentially outputs a digital value obtained by division and a digital value, which indicates a magnitude of the reduced pixel signal corresponding to a predetermined number of pixels included in the digital value obtained by division, as a set.

2. The solid-state imaging device according to claim 1, wherein the solid-state imaging device firstly outputs a digital value indicating the magnitude of the reduced pixel signal corresponding to the digital value obtained by division in each set of the digital value corresponding to the divided total pixel signal and the digital value indicating the magnitude of the reduced pixel signal corresponding to the digital value obtained by division.

3. A solid-state imaging device, comprising:
a pixel signal-processing unit which includes a plurality of pixels arranged in a two-dimensional matrix, wherein the pixel signal-processing unit outputs each of pixel signals generated by each of all of the arranged pixels as a total pixel signal while output each of the pixel signals generated by the plurality of pixels with the number of pixels reduced to a predetermined number of pixels as a reduced pixel signal;
a read unit circuit which outputs a digital value obtained by calculating a difference between a digital value indicating a magnitude of the total pixel signal and a digital value indicating a magnitude of the reduced pixel signal the read unit circuit reducing the number of bits of the calculated digital value of the difference by reducing lower bits, and the read unit circuit outputting a digital value whose number of bits is reduced as a digital value corresponding to the total pixel signal,
wherein the solid-state imaging device outputs the digital value corresponding to the total pixel signal and the digital value indicating the magnitude of the reduced pixel signal,
wherein the reduced pixel signal is a pixel signal generated by a predetermined pixel, and the reduced pixel signal is obtained among the pixel signals which are generated in the same exposure period by the plurality of corresponding pixels,
wherein the read unit circuit reduces the number of bits of the digital value of the difference, and outputs the digital value of the difference with the reduced number of bits as a digital value corresponding to the total pixel signal, and
wherein the solid-state imaging device divides the digital value corresponding to the total pixel signal for each digital value corresponding to a predetermined number of pixels, and sequentially outputs a digital value obtained by division and a digital value, which indicates a magnitude of the reduced pixel signal corresponding to a predetermined number of pixels included in the digital value obtained by division, as a set.

4. The solid-state imaging device according to claim 3, wherein the solid-state imaging device firstly outputs a digital value indicating the magnitude of the reduced pixel signal corresponding to the digital value obtained by division in each set of the digital value corresponding to the divided total pixel signal and the digital value indicating the magnitude of the reduced pixel signal corresponding to the digital value obtained by division.

5. An imaging system, comprising:
the solid-state imaging device according to claim 1,
wherein the digital value corresponding to the total pixel signal is restored to the digital value indicating the magnitude of the total pixel signal based on the digital value indicating the magnitude of the reduced pixel signal output from the solid-state imaging device.

6. The imaging system according to claim 5, wherein the imaging system restores the digital value indicating the magnitude of the total pixel signal by adding the digital value indicating the magnitude of the reduced pixel signal to the digital value corresponding to the total pixel signal.

* * * * *